(12) United States Patent
Schilders

(10) Patent No.: US 12,386,899 B2
(45) Date of Patent: Aug. 12, 2025

(54) SYSTEMS AND METHODS FOR CONTRACTS IN GRAPH-BASED MODELS

(71) Applicant: INFOSYS LIMITED, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 18/128,385

(22) Filed: Mar. 30, 2023

(65) Prior Publication Data

US 2024/0256604 A1 Aug. 1, 2024

Related U.S. Application Data

(60) Provisional application No. 63/448,718, filed on Feb. 28, 2023, provisional application No. 63/448,722, filed on Feb. 28, 2023, provisional application No. 63/448,711, filed on Feb. 28, 2023, provisional application No. 63/448,724, filed on Feb. 28, 2023, provisional application No. 63/448,743, filed on Feb. 28, 2023, provisional application No. 63/442,682, filed on Feb. 1, 2023, provisional application No. 63/442,324, filed on Jan. 31, 2023.

(51) Int. Cl.
*G06F 16/00* (2019.01)
*G06F 16/901* (2019.01)

(52) U.S. Cl.
CPC .............. *G06F 16/9024* (2019.01)

(58) Field of Classification Search
None
See application file for complete search history.

(56) References Cited

U.S. PATENT DOCUMENTS

| | | | |
|---|---|---|---|
| 2018/0165416 A1 | 6/2018 | Saxena et al. | |
| 2018/0262510 A1 | 9/2018 | Su | |
| 2018/0307748 A1* | 10/2018 | Freilinger | G06F 16/3346 |
| 2020/0380156 A1 | 12/2020 | Garg et al. | |
| 2021/0390141 A1* | 12/2021 | Jacob | G06F 9/3877 |
| 2022/0210061 A1 | 6/2022 | Simu et al. | |
| 2022/0292092 A1* | 9/2022 | Brown | G06F 16/24522 |

OTHER PUBLICATIONS

European Patent No. 23165413.8, Extended European Search Report, dated Jan. 5, 2024.

* cited by examiner

*Primary Examiner* — Anhtai V Tran
(74) *Attorney, Agent, or Firm* — Finnegan, Henderson, Farabow, Garrett & Dunner LLP

(57) ABSTRACT

A method for access management in graph-based model is provided. The graph-based model comprises a plurality of nodes and an overlay structure comprising processing logic. The overlay structure is associated with one or more nodes of the plurality of nodes. Processing circuitry determines a first node group of the graph-based model. The first node group comprises at least one node. The processing circuitry associates a first contract with the first node group such that the first contract is configured to act as a proxy for one or more nodes within the first node group in relation to requests from outside the first node group. The processing circuitry receives a stimulus and a context associated therewith. The stimulus is associated with the first contract. The processing circuitry maps the stimulus to the first contract to determine an access response. The processing circuitry processes the stimulus based on the access response.

32 Claims, 21 Drawing Sheets

PRIOR ART

| | Node Group Scope 610 | Target Node Scope 614 | Access for Internal Node 618 | Access for External Node 640 | Access for Internal Inherited Node 616 | Access for External Inherited Node 642 |
|---|---|---|---|---|---|---|
| ① | Public | Public | ✓ | ✓ | ✓ | ✓ |
| ② | Public | Private | ✓ | ✗ | ✓ | ✗ |
| ③ | Public | Protected | ✓ | ✗ | ✓ | ✓ |
| ④ | Private | Public | ✓ | Contract 606 | ✓ | ✗ |
| ⑤ | Private | Private | ✓ | ✗ | ✓ | ✗ |
| ⑥ | Private | Protected | ✓ | Contract 606 | ✓ | ✗ |
| ⑦ | Protected | Public | ✓ | ✗ | ✓ | ✓ |
| ⑧ | Protected | Private | ✓ | ✗ | ✓ | ✗ |
| ⑨ | Protected | Protected | ✓ | ✗ | ✓ | ✓ |

FIGURE 6B

| # | Node Group Scope 610 | Target Node Scope 614 | Attribute Scope 630 | Access for Internal Node 618 | Access for External Node 640 | Access for Internal Inherited Node 616 | Access for External Inherited Node 642 |
|---|---|---|---|---|---|---|---|
| 1 | Public | Public | Public | ✓ | ✓ | ✓ | ✓ |
| 2 | Private/Protected | Public | Public | ✓ | Contract 606 | ✓ | Contract 606 |
| 3 | Public/Private/Protected | Public | Private | ✗ | ✗ | ✗ | ✗ |
| 4 | Public/Private/Protected | Public | Protected | ✗ | ✗ | ✓ | ✓ |
| 5 | Public/Private/Protected | Private | Public | ✓ | ✗ | ✓ | ✗ |
| 6 | Public/Private/Protected | Private | Private | ✗ | ✗ | ✗ | ✗ |
| 7 | Public/Private/Protected | Private | Protected | ✗ | ✗ | ✓ | ✗ |
| 8 | Public/Private/Protected | Protected | Public | ✓ | ✗ | ✓ | ✓ |
| 9 | Public/Private/Protected | Protected | Private | ✗ | ✗ | ✗ | ✗ |
| 10 | Public/Private/Protected | Protected | Protected | ✗ | ✗ | ✓ | ✓ |

FIGURE 6C

SYSTEMS AND METHODS FOR CONTRACTS IN GRAPH-BASED MODELS

RELATED APPLICATIONS

The present application claims priority to U.S. Patent App. Ser. No. 63/442,324, filed Jan. 31, 2023; U.S. Patent App. Ser. No. 63/442,682, filed Feb. 1, 2023; U.S. Patent App. Ser. No. 63/448,718, filed Feb. 28, 2023; U.S. Patent App. Ser. No. 63/448,724, filed Feb. 28, 2023; U.S. Patent App. Ser. No. 63/448,743, filed Feb. 28, 2023; U.S. Patent App. Ser. No. 63/448,711, filed Feb. 28, 2023; and U.S. Patent App. Ser. No. 63/448,722, filed Feb. 28, 2023, and which are incorporated herein by reference in their entirety.

TECHNICAL FIELD

The present disclosure relates to graph-based models and particularly, but not exclusively, executable graph-based models. Particularly, but not exclusively, the present disclosure relates to providing access restricted executable graph-based models using scopes. Particularly, but not exclusively, the present disclosure relates to the use of contracts to control access to scoped portions of executable graph-based models.

BACKGROUND

Modern system designs typically separate data storage from any functional data structure used from a processing logic perspective. This separation often occurs when data is "at rest" or at run-time where the processing system interacts with a copy of the relevant data in the processing space that may be of a different representation. This separation also leads to an impedance mismatch which requires some form of a data management solution to perform the necessary mappings between the two states. As a result of this separate of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which may access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 may severely inhibit the flexibility, extensibility, and responsiveness of any system created.

Therefore, there is a need for enhanced architectures which provide improved flexibility, extensibility, and responsiveness thereby providing more efficient data processing systems.

SUMMARY OF DISCLOSURE

According to an embodiment of the present disclosure, there is provided a method for access management in an executable graph-based model. The executable graph-based model comprises a plurality of nodes and an overlay structure comprising processing logic, the overlay structure associated with one or more executable nodes of the plurality of nodes. The method comprises determining a first node group of the executable graph-based model, the first node group comprising at least one node. The method further comprises associating a first contract with the first node group such that the first contract is configured to act as a proxy for one or more nodes within the first node group in relation to requests from outside the first node group. The method further comprises receiving a stimulus and a context associated therewith, where the stimulus is associated with the first contract. The method further comprises, in response to the stimulus being received, mapping the stimulus to the first contract to determine an access response, and processing the stimulus based on the access response.

According to a further embodiment of the present disclosure there is provided a method for contract-based loading of executable-graph based models. The method comprises receiving a stimulus and an associated context, where the stimulus is associated with a contract node having a contract identifier. The method further comprises obtaining, based on the contract identifier, a contract node manifest associated with the contract node. The contract node manifest comprises the contract identifier, a first storage location associated with a contract node state, and one or more node identifiers of one or more nodes associated with the contract node. The method further comprises obtaining the contract node state from the first storage location and generating the contract node based on the contract node manifest and the contract node state. The method further comprises obtaining, based on the one or more node identifiers, one or more node manifests associated with the one or more nodes. Each of the one or more node manifests comprises a respective node identifier of the one or more node identifiers and a storage location associated with a respective node state. The method further comprises obtaining one or more node states for the one or more nodes. Each node state is obtained from the storage location associated with the respective node state. The method further comprises generating the one or more nodes based on the one or more node manifests and the one or more node states, generating one or more mappings from the contract node to the one or more nodes such that the contract node acts as a proxy for the one or more nodes, and processing the stimulus based on the contract node.

BRIEF DESCRIPTION OF FIGURES

Embodiments of the present disclosure will now be described, by way of example only, and with reference to the accompanying drawings, in which:

FIG. 6B shows a table of access rules for accessing a target node of the executable graph-based model shown in FIG. 6A according to embodiments of the present disclosure;

FIG. 6C shows a table of access rules for accessing an attribute of the target node shown in FIG. 6A according to embodiments of the present disclosure;

DETAILED DESCRIPTION

Figure 1:
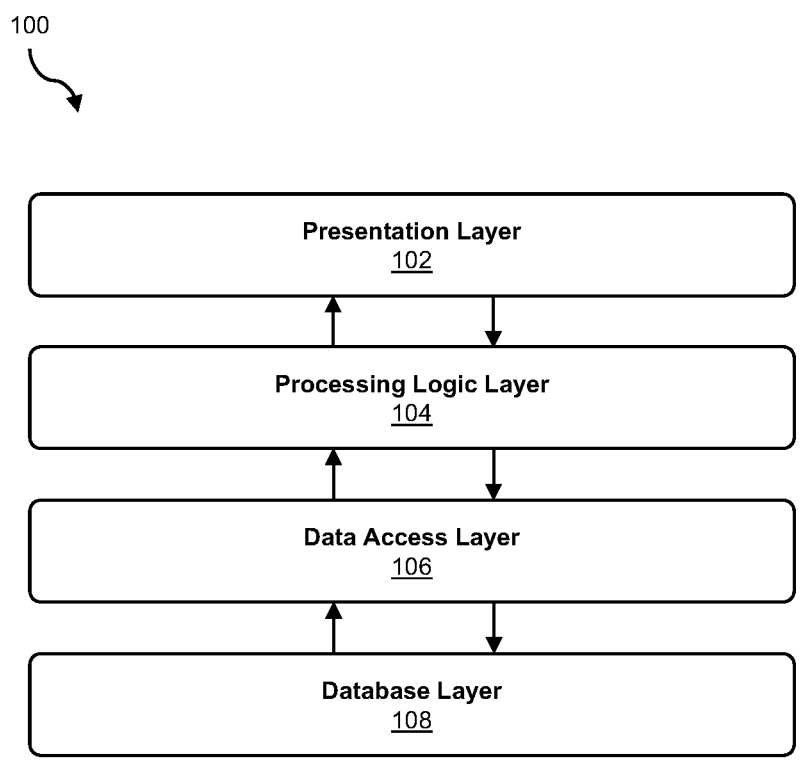
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic may be inhibitive to the types of architectural systems that may be created. Furthermore, the complexity of n-tier architectures, and their strict separation of functionality (layers), may severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

The present disclosure is directed to controlling access to portions of executable graph-based models based on the use of scopes and contracts. Executable graph-based models dynamically combine data and data processing functionality at run-time whilst their separability may be maintained when at rest. This is illustrated in FIG. 2.

Figure 2:
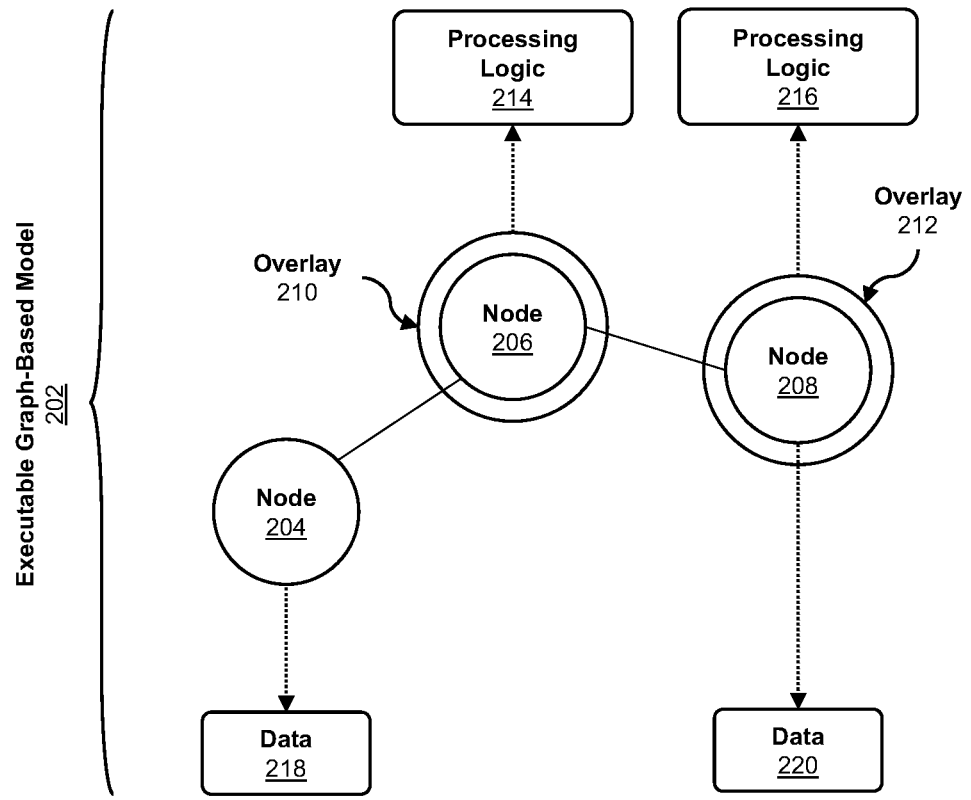
FIG. 2 shows an executable graph-based model according to an embodiment of the present disclosure.

FIG. 2 illustrates an executable graph-based model 202 according to an embodiment of the present disclosure.

The executable graph-based model 202 is generally formed of a data structure (i.e., a graph-based model, or graphical model) comprising a plurality of nodes 204-08 which may be functionally extended with processing logic via the use overlays 210, 212. Each overlay comprises processing logic, such as processing logic 214 and 216 which are associated with overlays 210 and 212 respectively. At run-time, data such as data 218, 220 is associated with nodes within the executable graph-based model 202 and the overlays 210, 212 provide the functionality to respond to stimuli an interact with, manipulate, or otherwise process the data. As such, the structure and functionality of the data processing is separate from the data itself when offline (or at rest) and is combined dynamically at run-time.

As such, the executable graph-based model 202 maintains separability of the data and the data processing logic when offline thereby allowing the data owner to maintain control over their data. Moreover, by integrating the data and the data processing logic within a single model, processing delays or latency are reduced because the data and the processing logic exist within the same logical system. Therefore, the executable graph-based model 202 is applicable to a range of time-critical systems where efficient processing of stimuli is required.

Figure 3:
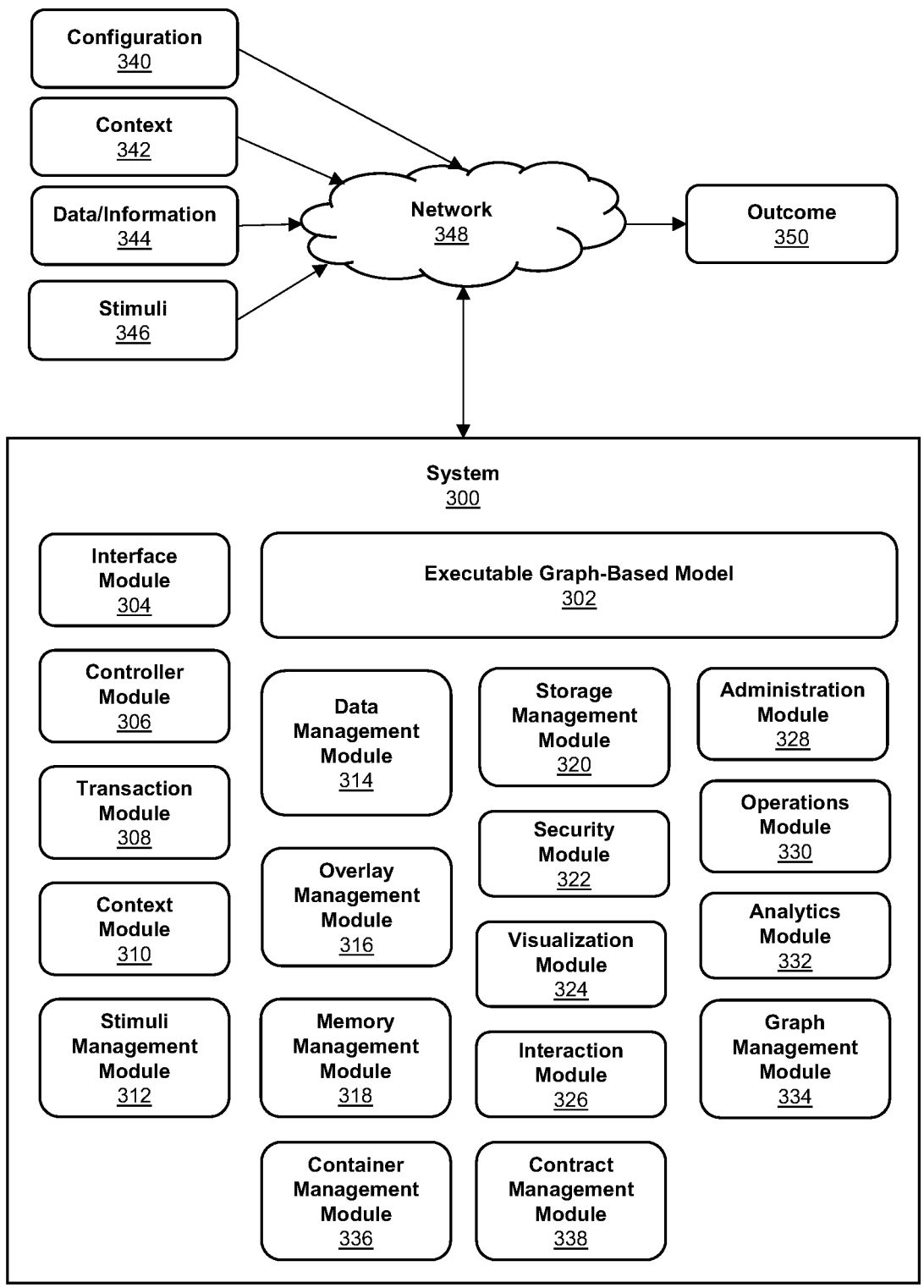
FIG. 3 shows a system for executable graph-based models according to an embodiment of the present disclosure.

FIG. 3 shows a system 300 for execution, management, and configuration of executable graph-based models according to an embodiment of the present disclosure.

The system 300 comprises an executable graph-based model 302 as described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, an analytics module 332, a graph management module 334, a container management module 336, and a contract management module 338. FIG. 3 further shows a configuration 340, a context 342, data 344, stimuli 346, a network 348, and an outcome 350.

The skilled person will appreciate that the present description of the system 300 is not intended to be limiting, and the system 300 may include, or interface with, further modules not expressly described herein. Moreover, the functionality of two or more of the modules may be combined within a single module. Conversely, the functionality of a single module may be split into two or more further modules which may be executed on two or more devices. The modules described below in relation to the system 300 may operate in a parallel, distributed, or networked fashion. The system 300 may be implemented in software, hardware, or a combination of both software and hardware. Examples of suitable hardware modules include, a general-purpose processor, a field programmable gate array (FPGA), and/or an application specific integrated circuit (ASIC). Software modules may be expressed in a variety of software languages such as C, C++, Java, Ruby, Visual Basic, Python, and/or other object-oriented, procedural, or other programming language.

The executable graph-based model 302 corresponds to the application specific combination of data and processing functionality which is manipulated, processed, and/or otherwise handled by the other modules within the system 300. As stated above, the structure and functionality of the data processing is separate from the data itself when offline (or at rest) and is combined dynamically at run-time. As such, different executable graph-based models are utilized for different application areas and problem domains. The skilled person will appreciate that whilst only one executable graph-based model 302 is shown in FIG. 3, in some embodiments a system stores and maintains more than one executable graph-based model.

All elements within the executable graph-based model 302 (both the data and the data processing functionality) are nodes. As will be described in more detail in relation to FIG. 4A below, a node forms the fundamental building block of all executable graph-based models. As such, the executable graph-based model 302 comprises one or more nodes which may be dynamically generated, extended, or processed by one or more other modules within the system 300 (e.g., by the data management module 314 and/or the overlay management module 316).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 340, the context 342, the data 344, and the stimuli 346 are received by the interface module 304 of the system 300 via the network 348. Similarly, outputs produced by the system 300, such as the outcome 350, are passed by the interface module 304 to the network 348 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the executable graph-based model 302 and the like. In one embodiment, the interface module 304 is communicatively coupled (i.e., connected either directly or indirectly) to one or more overlays within the executable graph-based model 302.

The controller module 306 handles and processes interactions and executions within the system 300. As will be described in more detail below, stimuli (and their associated contexts) provide the basis for all interactions within the executable graph-based model 302. Processing of such stimuli may lead to execution of processing logic associated with one or more overlays within the executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 346) and processes them based on a corresponding context (e.g., the context 342). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 342) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 may be external or internal. While some contexts apply to all application areas and problem spaces, some applications may require specific contexts to be generated and used to process received stimuli. As will be described in more detail below, the executable graph-based model 302 is configurable (e.g., via the configuration 340) so as only to execute within a given execution context for a given stimulus.

The stimuli management module 312 processes externally received stimuli (e.g., the stimuli 346) and any stimuli generated internally from any module within the system 300. The stimuli management module 312 is communicatively coupled (i.e., connected either directly or indirectly) to one or more overlays within the executable graph-based model 302 to facilitate processing of stimuli within the executable graph-based model 302. The system 300 utilizes different types of stimuli such as a command (e.g., a transactional request), a query, or an event received from an external system such as an Internet-of-Things (IoT) device. As previously stated, a stimulus may be either externally or internally generated. For example, a stimulus may be an event internally triggered (generated) from any of the modules within the system 300. Such internal stimuli indicate that something has happened within the system 300 such that subsequent handling by one or more other modules within the system 300 may be required. Internal stimuli may also be triggered (generated) from execution of processing logic associated with overlays within the executable graph-based model 302. The stimuli management module 312 communicates and receives stimuli in real-time or near-realtime. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 340) or dynamically determines what processing needs to be performed based on the contexts associated with the stimuli and/or based on the state of the executable graph-based model 302. In some examples, processing of a stimulus results in one or more outcomes being generated (e.g., the outcome 350). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 344) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the executable graph-based model 302). The overlay management module 316 is communicatively coupled (i.e., connected either directly or indirectly) to one or more other modules within the system 300 to complete some or all of these operations. For example, overlays may be persisted in some form of physical storage using the storage management module 320 (as described in more detail below). As a further example, overlays may be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture may be implemented using a different caching technology or architecture solution approach. In such implementations, each cache or caching tier may be configured (e.g., by the configuration 340) independently to the requirements for one or more of modules of the system 300. For example, data priority and an eviction strategy, such as least-frequently-used ("LFU") or least-recently-used ("LRU"), may be configured for all or parts of the executable graph-based model 302. In one embodiment, the memory management module 318 is communicatively coupled (i.e., connected either directly or indirectly) to one or more overlays within the executable graph-based model 302. The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 may directly address the computer readable medium (e.g., hard disk drive, external disk drive, or the like) upon which the data is being read or written. Alternatively, the storage management module 320 is connected to the storage device via a network such as the network 348 shown in FIG. 3. As will be described in more detail below in relation to FIGS. 11 and 12, the storage management module 320 uses "manifests" to manage the interactions between the storage device and the modules within the system 300. In one embodiment, the storage management module 320 is communicatively coupled (i.e., connected either directly or indirectly) to one or more overlays within the executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 may enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 may implement one or more layers of data protection to ensure that the PII or PHI are correctly processed and stored. In an additional example, in implementations whereby the system 300 operates on United States of America citizen medical data, the security module 322 may enforce additional protections or policies as defined by the United States Health Insurance Portability and Accountability Act (HIPAA). Similarly, if the system 300 is deployed in the European Union (EU), the security module 322 may enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the executable graph-based model 302 thereby directly connecting security execution to the data/information in the executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the executable graph-based model 302 and other parts of the system 300. As described in more detail below in relation to FIGS. 8A-8C, the visualization module 324 provides one or more displays, or visualizations, of the executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the executable graph-based model 302.

The administration module 328 manages all configurable aspects of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 340). Such dynamic configurations are controllable and changeable by an end-user with the appropriate administrative privileges. In one embodiment, the degree of administrative privileges associated with an end-user are contained within a received context (e.g., the context 342). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the executable graph-based model 302.

The analytics module 332 performs any analytical processing required by the modules within the system 300. The analytics module 332 processes any data embedded, or overlay contained, within the executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the executable graph-based model 302.

The graph management module 334 performs operations relating to sub-graphs within the executable graph-based model 302. The use of sub-graphs allows an executable graph-based model to be restructured into lower-level structural sub-graphs. At a general level, a sub-graph may be considered a hierarchically structured collection of nodes which are related in some manner (e.g., the nodes within the sub-graph are semantically related). Sub-graphs thus provide a mechanism for reusability of common data structures and/or functionality and may be more closely aligned to any contextualized stimuli received. The graph management module 334 manages all interactions between the executable graph-based model(s) and associated sub-graphs. The graph management module 334 controls the loading and unloading of these sub-graphs (which represent a portion of the executable graph-based model 302) at run-time based on received stimuli. That is, sub-graphs within an executable graph-based model may be dynamically loaded, executed, and/or unloaded "on demand" thereby allowing the compute and memory requirements of the executable graph-based model to be efficiently managed (i.e., by avoiding the need for all sub-graphs to be held in memory at all times during run-time). The graph management module 334 is communicatively coupled (i.e., connected either directly or indirectly) to one or more nodes and/or one or more overlays within the executable graph-based model 302.

The container management module 336 performs operations relating to containers within the executable graph-based model 302. At a general level, a container may be considered an aggregation of nodes which are related in some manner (e.g., semantically related). The container management module 336 manages all interactions between the executable graph-based model(s) and associated containers. The container management module 336 controls the loading and unloading of these containers (which represent a portion of the executable graph-based model 302) at run-time based on received stimuli. That is, containers within an executable graph-based model may be dynamically loaded, executed, and/or unloaded "on demand" thereby allowing the compute and memory requirements of the executable graph-based model to be efficiently managed (i.e., by avoiding the need for all containers to be held in memory at all times during run-time). The container management module 336 is communicatively coupled (i.e., connected either directly or indirectly) to one or more nodes and/or one or more overlays within the executable graph-based model 302.

The contract management module 338 manages scope and contracts within the executable graph-based model 302. As will be described in more detail below, any content within the executable graph-based model 302 may be defined with a scope of "public", "private", or "protected". Contracts restrict access to portions of the executable graph-based model 302 to the access scope and security privileges defined by the contract and any associated security overlays. The contract management module 338 enables content within the executable graph-based model 302 to be marked with a restricting scope (e.g., "public", "private", etc.) thereby restricting access to those users who have the appropriate credentials sourced from information in the context 342. The contract management module 338 then provides secured access to the relevant portion(s) of the executable graph-based model 302 via one or more contracts that configure the security (user roles and associated privileges) using overlays. As such, the contract management module 338 may be considered an extension of, or coordinator with, the security module 322 to manage user access based on contracts and the received context 342 and stimuli 346. The contract management module 338 is communicatively coupled (i.e., connected either directly or indirectly) to one or more nodes and/or one or more overlays within the executable graph-based model 302.

Having now described the system 300 for executing and managing executable graph-based models, the description will now turn to the elements of an executable graph-based model; specifically, the concept of a node. Unlike conventional graph-based systems, all objects (e.g., data, overlays, etc.) within the executable graph-based model (e.g., the executable graph-based model 302) are implemented as nodes. As will become clear, this allows executable graph-based models to be flexible, extensible, and highly configurable.

Figure 4A:
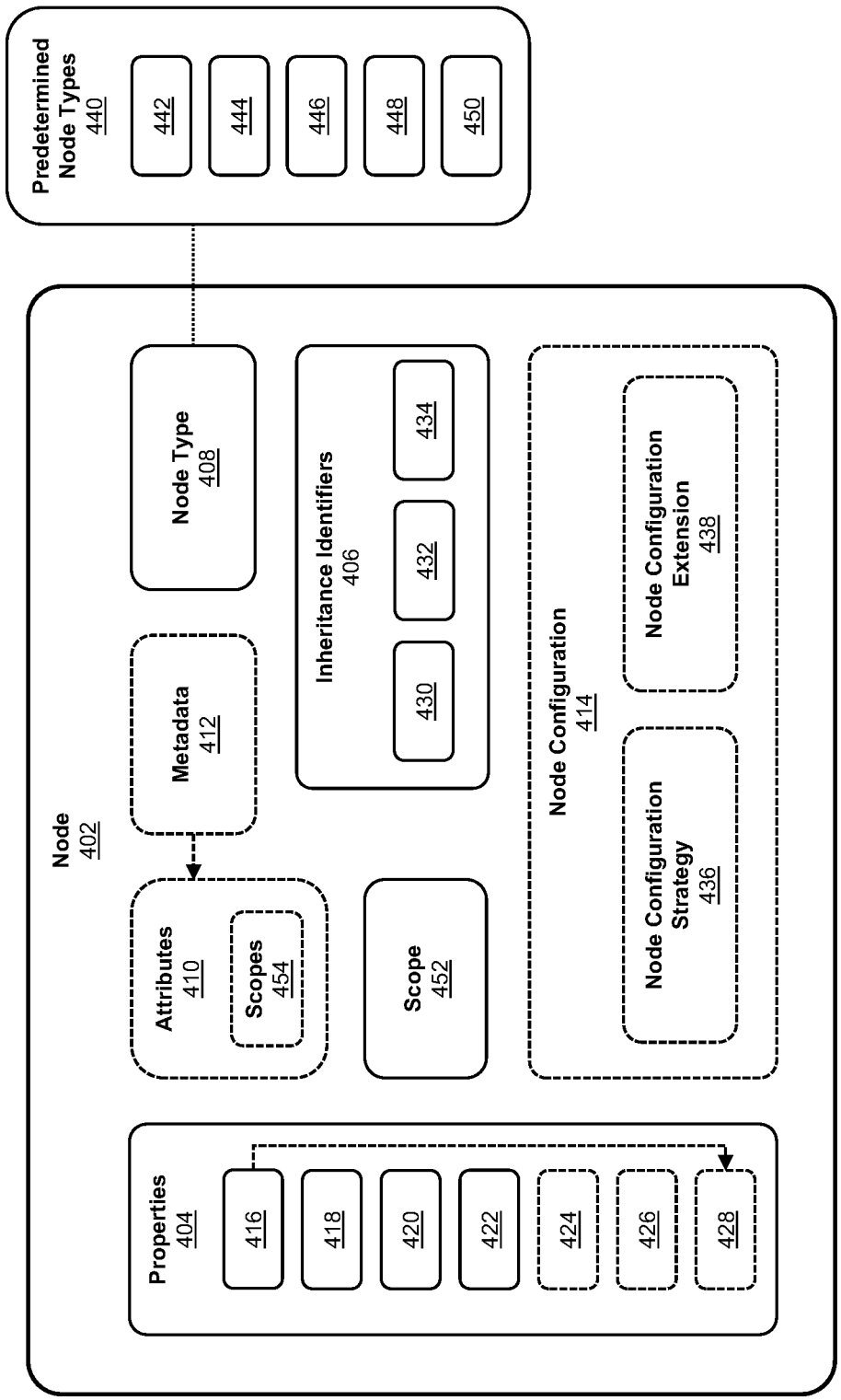
FIG. 4A shows the general structure of a node within an executable graph-based model according to an embodiment of the present disclosure.

FIG. 4A shows the general structure of a node 402 within an executable graph-based model, such as the executable graph-based model 302 shown in FIG. 3, according to an embodiment of the present disclosure.

FIG. 4A shows a node 402 which corresponds to the core structure of an executable graph-based model (e.g., the executable graph-based model 302 shown in the system 300 of FIG. 3) and which forms the foundational building block for all data and data processing logic within the executable graph-based model. The node 402 comprises properties 404, inheritance identifiers 406, and node type 408. The node 402 optionally comprises one or more attributes 410, metadata 412, a node configuration 414. The properties 404 of the node 402 include a unique identifier 416, a version identifier 418, a namespace 420, and a name 422. The properties 404 optionally include one or more icons 424, one or more labels 426, and one or more alternative identifiers 428. The inheritance identifiers 406 of the node 402 comprise an abstract flag 430, a leaf flag 432, and a root flag 434. The node configuration 414 optionally comprises one or more node configuration strategies 436 and one or more node configuration extensions 438. FIG. 4A further shows a plurality of predetermined node types 440 which include a data node type 442, an overlay node type 444, a graph node type 446, a container node type 448, and a contract node type 450. According to an embodiment of the present disclosure, the node 402 further comprises a scope 452 and the one or more attributes 410 comprise one or more scopes 454.

The unique identifier 416 is unique for each node within an executable graph-based model. The unique identifier 416 is used to register, manage, and reference the node 402 within the system (e.g., the system 300 of FIG. 3). In some embodiments, the one or more alternative identifiers 428 are associated with the unique identifier 416 to help manage communications and connections with external systems (e.g., during configuration, sending stimuli, or receiving outcomes). The version identifier 418 of the node 402 is incremented when the node 402 undergoes transactional change. This allows the historical changes between versions of the node 402 to be tracked by modules or overlays within the system. The namespace 420 of the node 402, along with the name 422 of the node 402, is used to help organize nodes within the executable graph-based model. That is, the node 402 is assigned a unique name 422 within the namespace 420 such that the name 422 of the node 402 need not be unique within the entire executable graph-based model, only within the context of the namespace 420 to which the node 402 is assigned.

The node 402 optionally comprises one or more icons 424 which are used to provide a visual representation of the node 402 when visualized (e.g., by the visualization module 324 of the system 300 shown in FIG. 3). The one or more icons 424 may include icons at different resolutions and display contexts such that the visualization of the node is adapted to different display settings and contexts. The node 402 also optionally comprises one or more labels 426 which are used to override the name 422 when the node is rendered or visualized.

The node 402 supports the software development feature of multiple inheritance by maintaining references (not shown) to zero or more other nodes, which then act as the base of the node 402. This allows the behavior and functionality of a node to be extended or derived from one or more other nodes within an executable graph-based model. The inheritance identifiers 406 of the node 402 provide an indication of the inheritance-based information, which is applicable, or may be applicable, to the node 402. The inheritance identifiers 406 comprise a set of Boolean flags which identify the inheritance structure of the node 402. The abstract flag 430 of the inheritance identifiers 406 allows the node 402 to support the construct of abstraction. When the abstract flag 430 takes a value of "true", the node 402 is flagged as abstract meaning that it may not be instantiated or created within an executable graph-based model. Thus, a node having the abstract flag 430 set to "true" may only form the foundation of another node that inherits from it. By default, the abstract flag 430 of a node is set to "false". The leaf flag 432 of the inheritance identifiers 406 is used to indicate whether any other node may inherit from the node 402. If the leaf flag 432 is set to "true", then no other node may inherit from the node 402 (but unlike an abstract node, a node with a leaf flag set may still be instantiated and created within an executable graph-based model). The root flag 434 of the inheritance identifiers 406 is used to indicate whether the node 402 inherits from any other node. If the root flag 434 is set to "true", then the node 402 does not inherit from any other node. The node 402 is flagged as leaf (i.e., the leaf flag 432 is set to "true") and/or root (i.e., the root flag 434 is set to "true"), or neither (i.e., both the leaf flag 432 and the root flag 434 are set to "false"). The skilled person will appreciate that a node maynot be flagged as both abstract and leaf (i.e., the abstract flag 430 maynot be set to "true" whilst the leaf flag 432 is set to "true").

As stated above, all elements of the executable graph-based model are defined as nodes. This functionality is in part realized due to the use of a node type. The node type 408 of the node 402 is used to extend the functionality of the node 402. All nodes within an executable graph-based model comprise a node type which defines additional data structures and implements additional executable functionality. A node type thus comprises data structures and functionality that is common across all nodes which share that node type. The composition of a node with a node type therefore improves extensibility by allowing the generation of specialized node functionalities for specific application areas. Such extensibility is not present in prior art graph-based models. As illustrated in FIG. 4A, the node 402 and the node type 408 are one logical unit which are not separated in the context of an executing system at run-time (i.e., in the context of execution of an executable graph-based model).

FIG. 4A shows the plurality of predetermined node types 440 which provides a non-exhaustive list of node types which may be associated with a node, such as the node 402. The data node type 442 (also referred to as a vertex or vertex node type) comprises common data structure and functionality related to the "things" modelled in the graph—i.e., the data. The overlay node type 444 is used to extend the functionality of a node, such as the node 402, to incorporate processing logic (as will be described in more detail below in relation to FIG. 4B).

The graph node type 446 and the container node type 448 are both examples of group node types. That is, these types extend the functionality of the node 402 by providing a mechanism for grouping related nodes. The container node type 448 comprises an aggregation of related nodes. That is, the container node type 448 encapsulates (comprises or comprises references to) one or more other nodes. Each of these nodes are thus a part of the container defined by the node 402 and the container node type 448 within the corresponding executable graph-based model. The graph node type 446 comprises a hierarchical structure of nodes. More particularly, the graph node type 446 comprises, or comprises references to, one or more other graph nodes (i.e., one or other nodes having the graph node type 446). A graph node comprising references to one or more other graph nodes is considered a parent graph node, with the one or more other graph nodes being considered child nodes (of the parent graph node). A graph node which has no parent graph node is said to be the root node, or root graph node; whilst a graph node which has no child graph nodes is said to be a leaf graph node. In this way, the graph node type 446 allows for a hierarchical structure of nodes to be defined and constructed within an executable graph-based model. In embodiments, the graph node type 446 further encapsulates (comprises or comprises references to) one or more non-graph nodes such as nodes having a data node type 442, a container node type 448, or the like.

The plurality of predetermined node types 440 shown in FIG. 4A further comprise the contract node type 450. As will be described in more detail below in relation to FIGS. 4C and 6A below, the contract node type 450 is used to define and restrict access to one or more nodes and/or one or more attributes of nodes within a node group (e.g., a graph, a container, etc.).

As stated above, the list of node types included within the plurality of predetermined node types 440 in FIG. 4A is non-exhaustive. A further node type which is not shown in FIG. 4A is the edge node type. The edge node type constructs associations and connections between nodes (for example objects or "things") within the executable graph-based model. The edge node type is not restricted to the number of nodes that may be associated or connected by a node having the edge node type. The data structures and functionality of the edge node type thus define a hyper-edge which allows two or more nodes to be connected through a defined set of roles.

The one or more attributes 410 correspond to the data associated with the node 402 (e.g., the data represented by the node 402 within the executable graph-based model as handled by a data management module such as the data management module 314 of the system 300 shown in FIG. 3). Because not all nodes within an executable graph-based model is associated with data, a node need not have any attributes. Each of the one or more attributes 410 are stored in any suitable format such as a data triplet of name, value type, and value.

The node 402 optionally comprises metadata 412 (e.g., data stored as a name, value type, and value triplet) which is associated with either the node 402 or one or more of the one or more attributes 410 of the node 402.

The node configuration 414 provides a high degree of configurability for the different elements of a node. The node configuration 414 optionally comprises one or more node configuration strategies 436 and/or one or more node configuration extensions 438 which are complex data types. An example of a concrete node configuration strategy is an identifier strategy, associated with the configuration of the unique identifier 416 of the node 402, which creates Snowflake identifiers. A further example of a concrete node configuration strategy is a versioning strategy, associated with the configuration of the version identifier 418 of the node 402, which supports major and minor versioning (depending on the type of transactional change incurred by the node 402).

According to an embodiment of the present disclosure, both the node 402 and the one or more attributes 410 of the node 402 (if the node comprises attributes) are scoped. That is, the node 402 comprises the scope 452 and the one or more attributes 410 comprise the one or more scopes 454 (i.e., each of the one or more attributes 410 comprises a corresponding scope within the one or more scopes 454). Scopes which may be assigned to either the scope 452 or each of the one or more scopes 454 include "public" scope, "private" scope, and "protected" scope, the definitions of which align with standard software development practices and terminology. The effects of different scopes on the node 402 and the one or more attributes 410 are described in more detail below in relation to FIGS. 6B and 6C below.

Figure 4B:
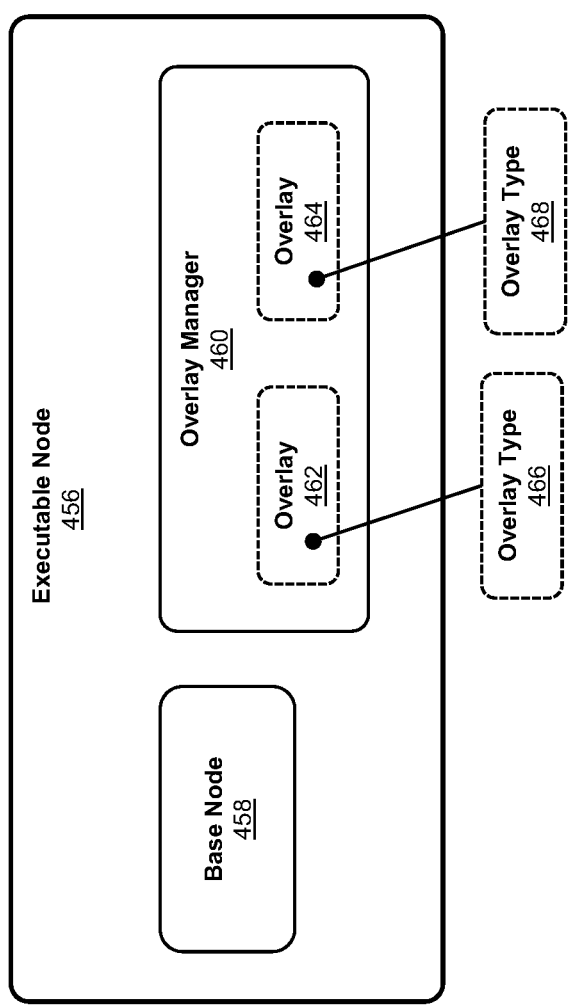
FIG. 4B shows an executable node according to an embodiment of the present disclosure.

The structure and functionality of the node 402 (as described above) may be dynamically extended using the concept of an executable node. As described in relation to FIG. 4B below, an executable node provides processing functionality (i.e., processing logic) for a base node via one or more associated overlay nodes. FIG. 4B shows an executable node 456 according to an embodiment of the present disclosure.

The executable node 456 comprises a base node 458 and an overlay manager 460. The overlay manager 460 registers and maintains one or more overlay nodes associated with the base node 458, such as the first overlay node 462 and the second overlay node 464. The first overlay node 462 has a first overlay node type 466 and the second overlay node 464 has a second overlay node type 468.

The executable node 456 is itself a node; that is, the executable node 456 extends the node 402 (or is a subtype of the node 402) such that all the functionality and properties of the node 402 extend to the executable node 456. The executable node 456 also dynamically extends the functionality of the base node 458 by associating the overlays maintained by the overlay manager 460 with the base node 458. The executable node may thus be considered a composition of a base node and an overlay node and may alternatively be referred to as a node with overlay. For example, the base node 458 may have a data node type associated with a user, and the overlay manager 460 may comprise an encryption overlay which has processing logic that encrypts the attribute values of the base node 458 (e.g., the values of the one or more attributes 410 shown in FIG. 4A) prior to the values being saved or output from the system. Therefore, the executable node 456 acts as a decorator of the base node 458 adding the functionality of the overlay manager 460 to the base node 458.

The skilled person will appreciate that the base node 458 refers to any suitable node within an executable graph-based model. As such, the base node 458 may be a node having a type such as a data node type (e.g., the data node type 442 shown in FIG. 4A), an overlay node type (e.g., the overlay node type 444 shown in FIG. 4A), or the like. Alternatively, the base node 458 may itself be an executable node such that the functionality of the base (executable) node 458 is dynamically extended. In this way, complex and powerful processing functionality may be dynamically generated by associating and extending overlay nodes.

The overlay manager 460 registers and maintains one or more overlay nodes associated with the base node 458, such as the first overlay node 462 and the second overlay node 464. The assignment of an overlay node to a base node (via the overlay manager 460) endows the base node with processing logic and executable functionality defined within the overlay node. Extending the functionality of a base node through one or more overlay nodes is at the heart of the dynamic generation of executable graph-based models according to an embodiment of the present disclosure. As illustrated in FIG. 2 above, the data (e.g., a data node as represented by the base node 458 in FIG. 4B) and the functionality which acts upon that data (e.g., an overlay node) may be separated and independently maintained offline, but at run-time, an association between the data node and the overlay node is determined and an executable node is generated (e.g., the executable node 456 shown in FIG. 4B).

An overlay node, such as the first overlay node 462 or the second overlay node 464, is a node having an overlay node type (alternatively referred to as an overlay type) assigned to its node type. As shown in FIG. 4B, the first overlay node 462 has the first overlay node type 466 and the second overlay node 464 has the second overlay node type 468. Different overlay node types are used to realize different functionality. Example overlay node types include an encryption overlay node type, an obfuscation overlay node type, an audit overlay node type, a prediction overlay node type, and the like. For example, if the first overlay node type 466 is an obfuscation node type and the second overlay node type 468 is an encryption node type then the functionality of the base node 458 is extended to provide obfuscation and encryption of attribute values of the base node 458. The skilled person will appreciate that the list of overlay types is in no way exhaustive and the number of different overlay types that may be realized is not limited. Because an overlay node is itself a node, all functionality of a node described in relation to the node 402 of FIG. 4A is thus applicable to an overlay node. For example, an overlay node comprises a unique identifier, a name, etc., may have attributes (i.e., an overlay node may have its own data defined), supports multiple inheritance, and may be configured via node configurations. Furthermore, because an overlay node is a node, the overlay node may have one or more overlay nodes associated therewith (i.e., the overlay node is an overlay with overlay node). Moreover, the processing functionality of an overlay node extends to the node type of the node to which the overlay node is applied.

An overlay node, such as the first overlay node 462 or the second overlay node 464, is not bound to a single executable node or a single executable graph-based model (unlike nodes which have non-overlay node types). This allows overlay nodes to be centrally managed and reused across multiple instances of executable graph-based models.

Unlike non-overlay nodes, an overlay node comprises processing logic (not shown in FIG. 4B) which determines the functionality of the overlay node. The processing logic of an overlay node comprises a block of executable code, or instructions, which carries out one or more operations. The block of executable code is pre-compiled code, code which requires interpretation at run-time, or a combination of both. Different overlay nodes provide different processing logic to realize different functionality. For example, an encryption overlay node comprises processing logic to encrypt the data (i.e., attributes) of a data node associated with the encryption overlay node, whilst an auditing overlay node comprises processing logic to record changes to the nodes state of a node associated with the auditing overlay node.

The overlay manager 460 of the executable node 456 is responsible for executing all overlays registered with the overlay manager 460. The overlay manager 460 also coordinates execution all associated overlay nodes. In the example shown in FIG. 4B, the executable node 456 associates the base node 458 with two overlay nodes—the first overlay node 462 and the second overlay node 464. Thus, the overlay manager 460 employs a strategy to manage the potentially cascading execution flow. Example strategies to manage the cascading execution of overlays include the visitor pattern and the pipe and filter pattern. Further examples include strategies which apply either depth-first or depth-first processing patterns, a prioritization strategy, or a combination therefor. All execution strategies are defined and registered with the overlay manager 460 and are associated with an overlay via a node configuration extension for the overlay.

Figure 4C:
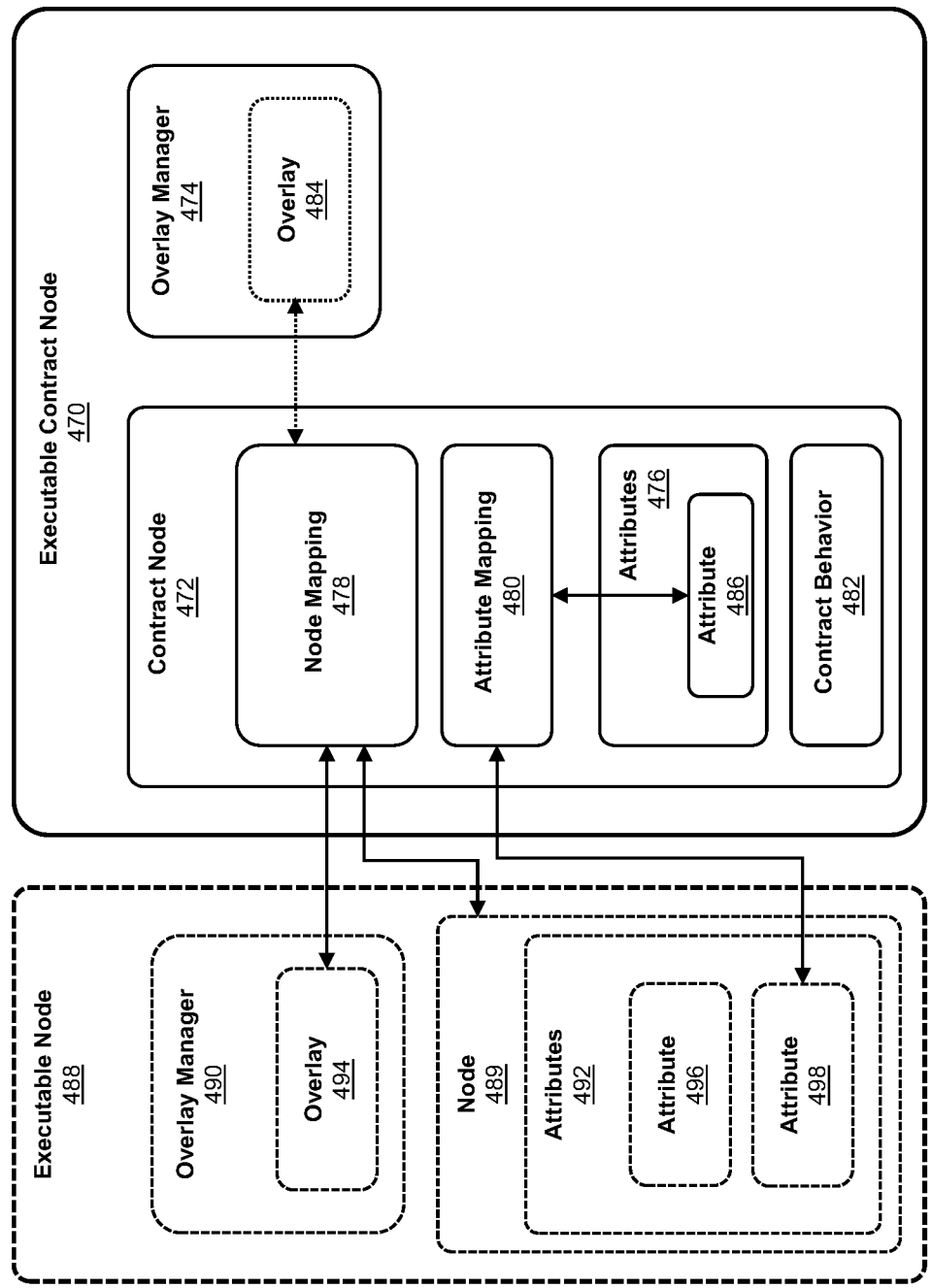
FIG. 4C shows the structure of a contract node according to an embodiment of the present disclosure.

According to an embodiment of the present disclosure, access to nodes and executable nodes within an executable graph-based model may be controlled using a contract node (otherwise referred to as a contract) as shown in FIG. 4C.

FIG. 4C shows the structure of an executable contract node 470 according to an embodiment of the present disclosure.

The executable contract node 470 is an executable node and has a contract node 472, and an overlay manager 474. The contract node 472 is a node having a contract node type (i.e., the contract node type 450 shown in FIG. 4A) and comprises one or more attributes 476. The contract node type of the contract node 472 comprises a node mapping 478, an attribute mapping 480, and a contract behavior 482. The node mapping 478, the attribute mapping 480, and the contract behavior 482 are a part of the contract node type but are shown in FIG. 4C as part of the contract node 472 for brevity and ease of reference. The overlay manager 474 of the executable contract node 470 comprises a first overlay 484. The one or more attributes 476 of the contract node 472 comprise a first attribute 486.

FIG. 4C further shows a target executable node 488 which is an executable node comprising a target base node 489 and an overlay manager 490. The target base node 489 comprises one or more attributes 492. The overlay manager 490 comprises a target overlay 494. The one or more attributes 492 comprises a non-target attribute 496 and a target attribute 498. As will be described in more detail below in relation to FIGS. 6A-6C, the target executable node 488 is public and the target attribute 498 is public (i.e., they both have "public" scope). The target executable node 488 is within a node group (not shown) which may be either public, private, or protected.

The contract node 472 comprises all of the structure and functionality of a node as described above in relation to the node 402 shown in FIG. 4A. The skilled person will appreciate that this structure and functionality (e.g., properties, scope, etc.) has been omitted from the representation in FIG.

4C for brevity. The contract node type (not shown) is used to define and restrict access to nodes and/or attributes within a node group (e.g., a graph, a container, etc.) using the node mapping 478 and the attribute mapping 480.

At a general level, the executable contract node 470 acts as a proxy for functionality and data associated with the target base node 489 and/or the target executable node 488 from requests outside of the node group within which the target executable node 488 is contained. Whilst the following description focusses on a scenario involving an executable contract node, the skilled person will appreciate that the description is applicable to a scenario involving a non-executable contract node (e.g., a scenario involving only the contract node 472 and the target base node 489). The contract executable node 470 does not directly expose the functionality and data of the target executable node 488. Indeed, calls made to the contract executable node 470 need not know that the target executable node 488 exists. Rather, the contract executable node 470, via the node mapping 478 and/or the attribute mapping 480 of the contract node 472, replicates the functionality and data of the target executable node 488. Nodes outside of the group containing the target executable node 488 need not know that either the target executable node 488, or the target base node 489, or the target attribute 498, exist since they are exposed via the contract executable node 470.

The node mapping 478 (alternatively referred to as a node access) maps to one or more public nodes within a node group such as a graph or a container. In FIG. 4C, the node mapping 478 maps to the target base node 489 which is a public node within a node group (which may be public, private, or protected). In one embodiment, the node mapping 478 also exposes the overlays that are associated with the target base node 489 via the target executable node 488 by mapping, at run-time, the target overlay 494 of the target executable node 488 to the overlay manager 474 of the executable contract node 470. In another embodiment, a dedicated overlay mapping of the contract node type performs the functionality regarding overlay mappings. In the example shown in FIG. 4C, the first overlay 484 associated with the executable contract node 470 is a representation of the target overlay 494 mapped at run-time from the target executable node 488 by the node mapping 478. Therefore, the executable contract node 470 replicates the functionality of the target executable node 488—as defined in the target overlay 494—through the use of the node mapping 478. Nodes outside of the node group which contains the target executable node 488 are thus able to utilize this functionality via the executable contract node 470 without the target executable node 488 being exposed. The node mapping 478 may also map other structure or functionality of the target base node 489 to the contract node 472. For example, the node mapping 478 may also map the functionality (overlays) and data (attributes) of a node to the contract node 472 thereby fully replicating the node.

The attribute mapping 480 (alternatively referred to as an attribute access) maps to one or more public attributes of a public node in a node group. In FIG. 4C, the attribute mapping 480 provides access to the target attribute 498 of the target base node 489. The target attribute 498 is an attribute of the target base node 489 having public scope. The contract node 740 does not directly expose (i.e., provide direct access to) the target attribute 498. Rather, the attribute mapping 480 maps from the target attribute 498 of the target base node 489 to the first attribute 486 of the contract node 472. As such, the first attribute 486 is a proxy for the target attribute 498 and allows nodes outside of the node group containing the target base node 489 to access the target attribute 498, albeit indirectly, without the target attribute 498 being exposed.

Both the node mapping 478 and the attribute mapping 480 may be implemented hierarchically, addressing the case where the contract node 470 may be inherited or where the access may be defined once and reused.

The contract behavior 482 defines functionality related to the contract node 472 which allows specific contract implementations to be created. That is, different contract behaviors may be available to be incorporated into a contract to modify the behavior of the contract. For example, a ledger contract behavior may utilize a blockchain, or other distributed ledger solution, to ensure adherence to contract rules and track the nodes that have been accessed via the contract type.

Before moving on to describing example uses of contracts within executable graph-based models, the description will first turn to the mechanisms by which executable graph-based models and contract nodes are persisted or stored.

Figure 5A:
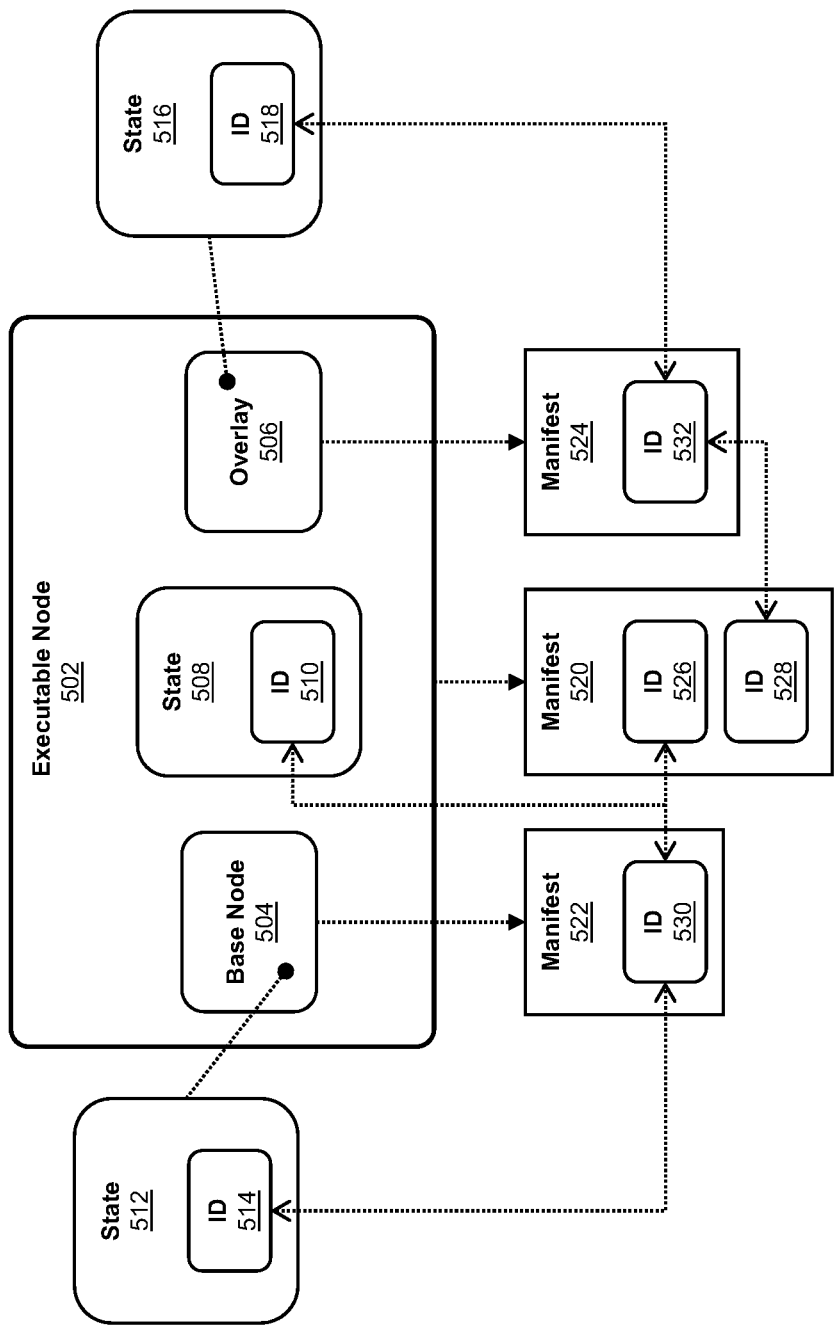
FIG. 5A shows the decomposition of an executable node for storage according to embodiments of the present disclosure.

FIG. 5A illustrates the decomposition of an executable node 502 for storage according to embodiments of the present disclosure.

The executable node 502 (e.g., the executable node 456 shown in FIG. 4B) comprises a composition of a base node 504 and an overlay node 506. The executable node 502 comprises a state 508 with an identifier 510, the base node 504 comprises a state 512 with an identifier 514, and the overlay node 506 comprises a state 516 with an identifier 518. A manifest 520-524 is generated for each of the executable node 502, the base node 504, and the overlay node 506. The manifest 520 associated with the executable node 502 comprises an identifier 526 and an overlay identifier 528. The manifest 522 associated with the base node 504 comprises an identifier 530 and the manifest 524 associated with the overlay node 506 comprises an identifier 532.

The state 508 of the executable node 502 comprises all data required to reconstruct the executable node 502 (e.g., attributes, properties, etc.). The state 508 of the executable node 502 is persistently stored along with the identifier 510. The manifest 520 is generated for the executable node 502 and comprises the identifier 526 (which is the same as the identifier 510), the storage location of the state 508 of the executable node 502, and the overlay identifier 528 (which is the same as the identifier 532). The overlay identifier 528 thus identifies the manifest 524 associated with the overlay node 506. A manifest state (not shown) is then generated for the manifest 520 and persistently stored along with the identifier 526.

The state 512 of the base node 504 comprises all data required to reconstruct the base node 504 (e.g., attributes, properties, etc.) and is persistently stored along with the identifier 514. The manifest 522 is generated for the base node 504 and comprises the identifier 530 and the storage location of the state 512 of the base node 504. The identifier 514 of the state 512 and the identifier 530 of the manifest 522 is the same as the identifier 510 of the state 508 of the executable node 502 (which is also the same as the identifier 526 of the manifest 520 of the executable node 502). A manifest state (not shown) is then generated for the manifest 522 and persistently stored along with the identifier 530. Thus, the states, manifests, and manifest states for the executable node 502 and the base node 504 all comprise the same, shared, identifier. A shared identifier may be used in this instance because the states, manifests, and manifest states are stored separately.

The state 516 of the overlay node 506 comprises all data required to reconstruct the overlay node 506 (e.g., attributes, properties, processing logic, etc.) and is persistently stored along with the identifier 518. The manifest 524 is generated for the overlay node 506 and comprises the identifier 532, which is the same as the identifier 518. A manifest state (not shown) is then generated for the manifest 524 and is persistently stored along with the identifier 532.

Therefore, an executable graph-based model may be stored (and loaded) using the above described decomposition. Beneficially, each component is stored separately thereby allowing a user to maintain and store their data independently of the storage of the structure and functionality of the executable graph-based model.

Figure 5B:
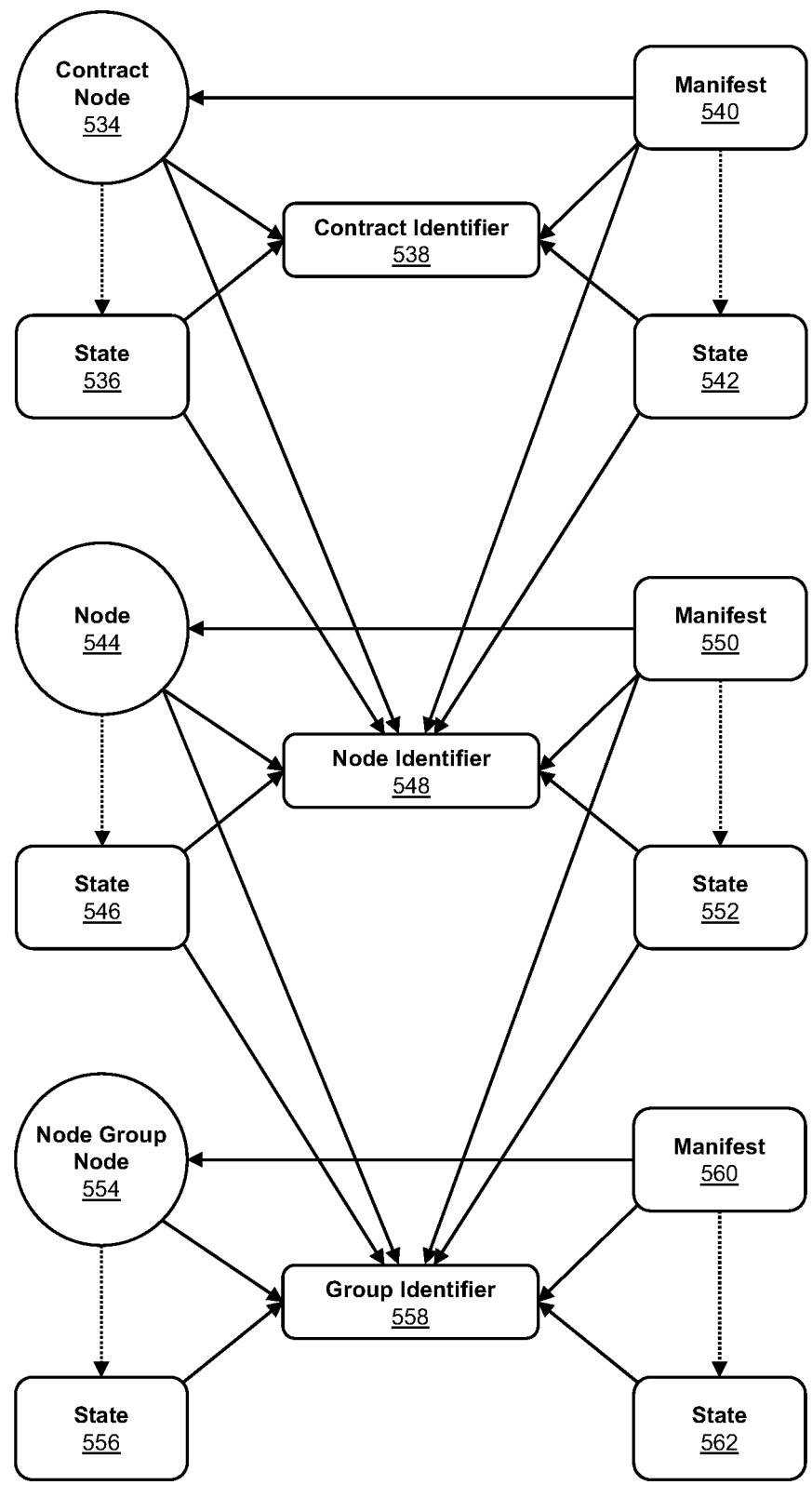
FIG. 5B shows the decomposition of a contract node for storage according to an embodiment of the present disclosure.

FIG. 5B shows the decomposition of a contract node 534 for storage according to an embodiment of the present disclosure.

FIG. 5B shows the contract node 534, a state 536 of the contract node 534, a contract identifier 538 associated with the contract node 534, a manifest 540 of the contract node 534, and a manifest state 542 of the manifest 540. The contract node 534 is a node within a graph-based model, or executable graph-based model, such that the contract node 534 is decomposed into a state—i.e., the state 536—and a behavior—i.e., the manifest 540. The manifest state 542 is generated from the manifest 540 of the contract node 534 such that the contract node 534 is persisted by storing the state 536 and the manifest state 542. To maintain integrity, the state 536, the manifest 540, and the manifest state 542 all maintain a reference to the contract identifier 538 which uniquely identifies the contract node 534.

FIG. 5B further shows a node 544 which is a part of the contract defined by the contract node 534. The node 544 is decomposed for storage by separating the behavior and state of the node. A node state 546 is extracted from the node 544 and both the node 544 and the node state 546 are associated with a unique node identifier 548. A manifest 550 is generated for the node 544 to capture the behavior of the node 544. A manifest state 552 is generated from the manifest 550. The manifest 550 and the manifest state 552 are associated with the unique node identifier 548. The node 544 is persisted by storing the node state 546 and the manifest state 552.

To maintain the relationship between the contract node 534 and the node 544. Because the contract node 534 does not own the node 544, the decomposed elements of the contract node 534 maintain a reference to the unique node identifier 548. That is, the contract node 534, the state 536, the manifest 540, and the manifest state 542 all hold a reference to the unique node identifier 548 (and unique identifiers of any other nodes associated with the contract node 534). Thus, the nodes associated with a contract node's node access mapping and/or attribute mapping are referenced by the contract node when decomposed for storage thereby allowing the node access relationship to be constructed when the contract node is loaded.

FIG. 5B further shows the decomposition for storage of the relationship between the node 544 and the node group within which the node 544 is contained. FIG. 5B shows a node group node 554 which has a node state 556. The node group node 554 and the node state 556 are associated with a unique node group identifier 558. A manifest 560 is generated for the node group node 554 and a manifest state 562 is generated from the manifest 560 for storage (along with the node state 556). Both the manifest 560 and the manifest state 562 comprise the unique node group identifier 558.

The relationship between the node 544 and the node group represented by the node group node 554 is maintained during decomposition for storage by the decomposed elements of the node 544 (i.e., the node 544, the node state 546, the manifest 550, and the manifest state 552) maintaining references to the unique node group identifier 558.

The hierarchical decomposition of the elements of a contract, as illustrated in FIG. 5B, allow the nodes associated with a specific contract to be quickly identified and loaded thereby providing an efficient mechanism for "on-demand" loading and execution of contracts (as will be described in more detail below).

Having described the structure and composition of executable graph-based models, executable nodes, and contract nodes, the description will now turn to the uses and benefits of node/attribute scope and contracts (contract nodes) within executable graph-based models.

Figure 6A:
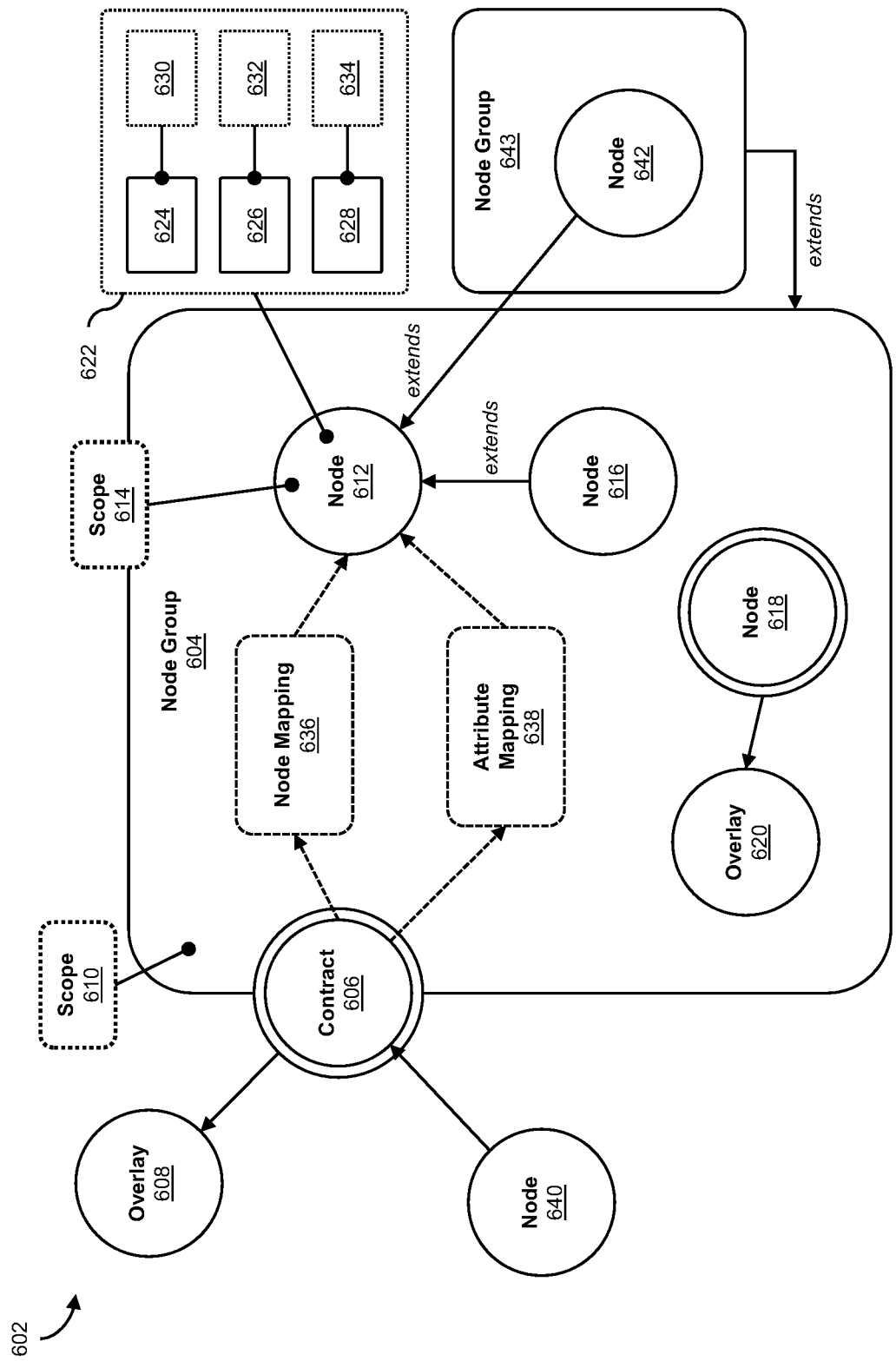
FIG. 6A shows an executable graph-based model implementing contracts according to an embodiment of the present disclosure.

FIG. 6A shows an executable graph-based model 602 implementing contracts according to an embodiment of the present disclosure.

The executable graph-based model 602 comprises a first node group 604 with a contract node 606 which acts as a proxy for one or more nodes within the first node group 604 in relation to requests from outside the first node group 604. The contract node 606 is an executable node within the executable graph-based model 602 and has an overlay node 608. The first node group 604 has a node group scope 610. The first node group 604 comprises a target node 612 having a target node scope 614, an internal inherited node 616 inherited from the target node 612, an internal node 618, and an overlay node 620 associated with the internal node 618. The target node 612 comprises a plurality of attributes 622 including a first attribute 624, a second attribute 626, and a third attribute 628. The first attribute 624 has a first attribute scope 630, the second attribute 626 has a second attribute scope 632, and the third attribute 628 has a third attribute scope 634. A node mapping 636 may be used by the contract node 606 to map from the contract node 606 to the target node 612 depending on scope (as described in more detail below). An attribute mapping 638 is used by the contract node 606 to map from the contract node 606 to one or more of the plurality of attributes 622 of the target node 612 depending on scope (as described in more detail below). The executable graph-based model further comprises an external node 640 and an external inherited node 642 which are both outside of the first node group 604. The external inherited node 642 is within an inherited node group 643 which is inherited from the first node group 604. The external inherited node 642 inherits from the target node 612.

As will be shown in FIGS. 6B and 6C, access to the target node 612 and/or selected attributes of the target node 612 (e.g., the first attribute 624) depend on the node group scope 610, the target node scope 614, and the requisite attribute scope (e.g., the first attribute scope 630).

FIG. 6B shows a table 644 of access rules for accessing the target node 612 of the executable graph-based model 602 shown in FIG. 6A depending on scope according to embodiments of the present disclosure.

The table 644 lists the access rules for accessing the target node 612 of the executable graph-based model 602 shown in FIG. 6A depending on the node group scope 610 of the first node group 604 (first column), the target node scope 614 of the target node 612 (second column), and the relationship of the accessing node to the target node 612 (third to sixth columns). The nodes listed in the table 644 which may request access to the target node 612 are the internal node 618 (third column), the external node 640 (fourth column), the internal inherited node 616 (fifth column), and the external inherited node 642 (sixth column). In one embodiment, the access rules listed in the table 644 are enforced by a contract management module such as the contract management module 338 of the system 300 shown in FIG. 3.

The first two columns of the table 644 list the permutations of the node group scope 610 of the first node group 604 and the target node scope 614 of the target node 612 for the three possible scopes of public, private, and protected. As mentioned above, these scopes follow their standard meaning as is known within the field of software engineering. The third to sixth columns then list the access status for a given node (e.g., the internal node 618, the external node 640, etc.) based on the specific scope combination defined by the first two columns. Each row of the table 644, identified by the integers "1" through "9" within circles in FIG. 6B, thus corresponds to the set of access rules in relation to the target node 612 for the different nodes within the executable graph-based model 602 based on a specific combination of node group and target node scope. In all scenarios listed in the table 644, the scope of the contract node 606 is public The first row of the table 644 (identified by the circled "1") lists the set of access rules when both the node group scope 610 and the target node scope 614 are public. As may be seen from the first row of the table 644, in this scenario any node within the executable graph-based model 602 is able to access the target node 612. Although not a requirement for access, the contract node 606 may be used in this scenario to provide controlled access to the functionality and behavior of the target node 612 from requests outside of the first node group 604. That is, the node mapping 636 maps from the contract node 606 to the target node 612 such that the contract node 606 provides a representation of the target node 612 to nodes outside of the first node group 604 (e.g., the external node 640).

The second row of the table 644 (identified by the circled "2") lists the set of access rules when the node group scope 610 is public and the target node scope 614 is private. In this scenario, the target node 612 remains accessible to nodes within the first node group 604, including the internal node 618 and the internal inherited node 616, but is not accessible to nodes outside of the first node group 604. This includes not being accessible by the external inherited node 642. The target node 612 is also not accessible to any other non-inherited nodes outside of the first node group 604 (e.g., the target node 612 is not accessible to the external node 640). Moreover, the target node 612 is not accessible by way of the contract node 606 as the target node scope 614 is not public. That is, in this and similar scenarios where the target node scope 614 is not public, there would be no node mapping (such as the node mapping 636) mapping from the contract node 606 to the target node 612 because the target node scope 614 does not allow for such a mapping to be generated.

The third row of the table 644 (identified by the circled "3") lists the set of access rules when the node group scope 610 is public and the target node scope 614 is protected. In this scenario, the target node 612 is accessible to nodes within the first node group 604, including the internal node 618 and the internal inherited node 616, and is also accessible to nodes outside of the first node group 604 which are within a node group inherited from the first node group 604 and which are themselves inherited from the target node 612, such as the external inherited node 642 which is within the inherited node group 643. The target node 612 is not accessible to any non-inherited nodes outside of the first node group 604 (e.g., the target node 612 is not accessible to the external node 640). Moreover, the target node 612 is not accessible by way of the contract node 606 as the target node scope 614 is not public.

The fourth row of the table 644 (identified by the circled "4") lists the set of access rules when the node group scope 610 is private and the target node scope 614 is public. In this scenario, the target node 612 is accessible to nodes within the first node group 604, including the internal node 618 and the internal inherited node 616, but is not accessible to nodes outside of the first node group 604 with the use of the contract node 606. As such, in the scenario defined in the fourth row of the table 644, the external node 640 accesses the functionality and behavior of the target node 612 via the contract node 606. More particularly, and as described in more detail above in relation to FIG. 4C, the contract node 606 comprises a representation of the target node 612 such that the external node 640 accesses the functionality and behavior of the target node 612 only through the contract node 606 which acts as a proxy for the target node 612. Because the target node 612 is not directly exposed by the contract node 606, the external node 640 does not know that the target node 612 exists (or, indeed, any other node within the first node group 604). As such, the external node 640 may only access the functionality and behavior of the target node 612 through the replication of the target node 612 maintained by the contract node 606. Although the external inherited node 642 is listed as not being able to access the target node 612 in this scenario, the access referred to here is the access that an inheriting node would usually have to a parent node. The external inherited node 642 is still able to access the functionality and behavior of the target node 612 via the contract node 606.

In the scenario defined in the fourth row of the table 644, the contract node 606 is configured to act as a proxy for the target node 612. More particularly, the node mapping 636 is used to map from the contract node 606 to the target node 612 such that the contract node 606 maintains a behaviorally and functionally consistent representation of the target node 612. From the perspective of nodes outside of the first node group 604 (e.g., the external node 640), the target node 612 is private and thus not visible or directly accessible. Indeed, a node outside of the first node group 604 are not aware of the existence of the target node 612 due to its private scope. However, the contract node 606 makes the behavior and/or functionality of the target node 612 available to such external nodes and thus acts as a form of application programming interface (API) to the first node group 604. However, the contract node 606 acts as a stateful API because the contract node 606 may itself have attributes and functionality that extend beyond those that are mapped by the contract node 606. The contract node 606 thus provides a point of access to the first node group 604 and allows a configurable mechanism for exposing functionality of the first node group 604 whilst maintaining security (e.g., via a suitably defined overlay associated with the contract node 606).

The fifth row of the table 644 (identified by the circled "5") lists the set of access rules when the node group scope 610 is private and the target node scope 614 is private. In this scenario, the target node 612 is accessible to nodes within the first node group 604, including the internal node 618 and the internal inherited node 616, but is not accessible to nodes outside of the first node group 604. This includes not being accessible by the external inherited node 642. The target node 612 is also not accessible to any other inherited nodes outside of the first node group 604 which is within a node group inherited from the first node group 604 (e.g., the target node 612 is not accessible to the external node 640). Moreover, the target node 612 is not accessible by way of the contract node 606 as the target node scope 614 is not public.

The sixth row of the table 644 (identified by the circled "6") lists the set of access rules when the node group scope 610 is private and the target node scope 614 is protected. In this scenario, the target node 612 is accessible to nodes within the first node group 604, including the internal node 618 and the internal inherited node 616, but is not accessible to nodes outside of the first node group 604. This includes not being accessible by the external inherited node 642 which is within the Inherited node group 643 which is inherited from the first node group 604. The target node 612 is also not accessible to any other inherited nodes outside of the first node group 604 (e.g., the target node 612 is not accessible to the external node 640). Moreover, the target node 612 is not accessible by way of the contract node 606 as the target node scope 614 is not public.

The seventh row of the table 644 (identifier by the circled "7") lists the set of access rules when the node group scope 610 is protected and the target node scope 614 is public. In this scenario, the target node 612 is accessible to nodes within the first node group 604, including the internal node 618 and the internal inherited node 616, and is also accessible to nodes outside of the first node group 604 within a node group inherited from the first node group 604 and which are themselves inherited from the target node 612, such as the external inherited node 642 within the inherited node group 643. The target node 612 is not accessible to any non-inherited nodes outside of the first node group 604 (e.g., the target node 612 is not accessible to the external node 640) without the use of the contract node 606. As such, in the scenario defined in the seventh row of the table 644, the external node 640 accesses the functionality and behavior of the target node 612 via the contract node 606. The eighth row of the table 644 (identified by the circled "8") lists the set of access rules when the node group scope 610 is protected and the target node scope 614 is private. In this scenario, the target node 612 remains accessible to nodes within the first node group 604, including the internal node 618 and the internal inherited node 616, but is not accessible to nodes outside of the first node group 604. This includes not being accessible by the external inherited node 642. The target node 612 is also not accessible to any other inherited nodes outside of the first node group 604 (e.g., the target node 612 is not accessible to the external node 640). Moreover, the target node 612 is not accessible by way of the contract node 606 as the target node scope 614 is not public.

The ninth row of the table 644 (identified by the circled "9") lists the set of access rules when the node group scope 610 is protected and the target node scope 614 is protected. In this scenario, the target node 612 is accessible to nodes within the first node group 604, including the internal node 618 and the internal inherited node 616, and is also accessible to nodes outside of the first node group 604 which are within a node group inherited from the first node group 604 and which are themselves inherited from the target node 612, such as the external inherited node 642 which is within the inherited node group 643. The target node 612 is not accessible to any non-inherited nodes outside of the first node group 604 (e.g., the target node 612 is not accessible to the external node 640). Moreover, the target node 612 is not accessible by way of the contract node 606 as the target node scope 614 is not public. FIG. 6C shows a table 646 of access rules for accessing the first attribute 624 of the target node 612 of the executable graph-based model 602 shown in FIG. 6A depending on scope, according to embodiments of the present disclosure.

The scenario detailed in FIG. 6C is for a public contract (i.e., the contract node 606 has public scope). Internal and protected contracts would have different rules since you can create a contract that aggregates the same node information with the same scope. For example, a private contract within the first node group 604 would be able to aggregate any information provided it maintained the lowest common denominator of scope (which is public>protected>private). So aggregate public and protected information means the contract must be protected because it is the lowest common denominator whilst aggregated private information means that the contract must be private since it is the lowest common denominator. This is akin to what is shown in FIGS. 6B and 6C in relation to the contract node 606 which is public so can only hold public data. If the contract node 606 mapped to any private or protected information, then it would not be a public contract. If the contract node 606 contained public and protected information then the contract node 606 would be protected. If the contract node 606 contained any private data, irrespective if it has public and protected data, then the contract node 606 would be private.

The table 646 lists the access rules for accessing the first attribute 624 of the target node 612 of the executable graph-based model 602 shown in FIG. 6A depending on the node group scope 610 of the first node group 604 (first column), the target node scope 614 of the target node 612 (second column), the first attribute scope 630 of the first attribute 624 of the target node 612 (third), and the relationship of the accessing node to the target node 612 (fourth to seventh columns). The nodes listed in the table 646 which may request access to the first attribute 624 are the internal node 618 (fourth column), the external node 640 (fifth column), the internal inherited node 616 (sixth column), and the external inherited node 642 (seventh column). In one embodiment, the access rules listed in the table 646 are enforced by a contract management module such as the contract management module 338 of the system 300 shown in FIG. 3.

The first three columns of the table 646 list permutations of the node group scope 610 of the first node group 604, the target node scope 614 of the target node 612, and the first attribute scope 630 of the first attribute 624 for the three possible scopes of public, private, and protected. As mentioned above, these scopes follow their standard meaning as is known within the field of software engineering. The fourth to seventh columns then list the access status in relation to the first attribute 624 of the target node 612 for a given node (e.g., the internal node 618, the external node 640, etc.) based on the specific scope combination defined by the first two columns. Each row of the table 646, identified by the integers "1" through "10" within circles in FIG. 6C, thus corresponds to the set of access rules in relation to the first attribute 624 of the target node 612 for the different nodes within the executable graph-based model 602 based on a specific combination of node group scope, node scope, and attribute scope.

The first row of the table 646 (identified by the circled "1") lists the set of access rules when the node group scope 610 is public, the target node scope 614 is public, and the first attribute scope 630 is public. In this scenario, any node within the executable graph-based model 602 is able to access the first attribute 624 of the target node 612. Although not a requirement for access, the contract node 606 may be used in this scenario to provide controlled access to the first attribute 624 from requests outside of the first node group 604.

The second row of the table 646 (identified by the circled "2") lists the set of access rules when the node group scope 610 is private or protected, the target node scope 614 is public, and the first attribute scope 630 is public. In this scenario, the first attribute 624 is accessible to all nodes within the first node group 604, including those that inherit from the target node 612 (i.e., the internal inherited node 616).

In this scenario, the first attribute 624 is only accessible to nodes outside of the first node group 604, such as the external node 640 and the external inherited node 642, via the contract node 606. More particularly, the external node 640 and the external inherited node 642 only interact with the contract node 606 in relation to the first attribute 624. From the perspective of the external node 640 and the external inherited node 642, the first attribute 624 is only visible and accessible via the contract node 606. Put another way, in the scenario defined in the second row of the table 646, nodes which are external to the first node group 604 are not aware of the existence of the first attribute 624 except via a representation of the first attribute 624 provided by the contract node 606 and obtained by the contract node 606 via the attribute mapping 638. Therefore, the use of scopes and contracts allows the set of attributes to expose externally to be filtered (via setting the respective attribute scopes) and securely exposed (via the contract node 606 and the attribute mapping 638).

The third row of the table 646 (identified by the circled "3") lists the set of access rules when the node group scope 610 is either public, private, or protected, the target node scope 614 is public, and the first attribute scope 630 is private. In this scenario, the first attribute 624 is not accessible to any nodes either inside or outside of the first node group 604. Thus, even though the target node scope 614 is public, because the first attribute scope 630 is private, the first attribute 624 is only accessible to the target node 612.

The fourth row of the table 646 (identified by the circled "4") lists the set of access rules when the node group scope 610 is either public, private, or protected, the target node scope 614 is public, and the first attribute scope 630 is protected. In this scenario, the first attribute 624 is only accessible to the target node 612 and nodes which inherit from the target node 612—e.g., the internal inherited node 616 and the external inherited node 642.

The fifth row of the table 646 (identified by the circled "5") lists the set of access rules when the node group scope 610 is either public, private, or protected, the target node scope 614 is private, and the first attribute scope 630 is public. In this scenario, the first attribute 624 is accessible to nodes within the first node group 604, such as the internal node 618 and the internal inherited node 616, but is not accessible to any nodes outside of the first node group 604. The first attribute 624 is not accessible by means of the contract node 606 because the target node scope 614 is not public.

The sixth row of the table 646 (identified by the circled "6") lists the set of access rules when the node group scope 610 is either public, private, or protected, the target node scope 614 is private, and the first attribute scope 630 is private. In this scenario, the first attribute 624 is not accessible to any nodes either inside or outside of the first node group 604 except the target node 612.

The seventh row of the table 646 (identified by the circled "7") lists the set of access rules when the node group scope 610 is either public, private, or protected, the target node scope 614 is private, and the first attribute scope 630 is protected. In this scenario, the first attribute 624 is only accessible to the target node 612 and nodes within the first node group 604 which inherit from the target node 612—e.g., the internal inherited node 616. The first attribute 624 is not accessible to other nodes within the first node group 604, such as the internal node 618, or to inherited nodes outside of the first node group 604, such as the external inherited node 642.

The eighth row of the table 646 (identified by the circled "6") lists the set of access rules when the node group scope 610 is either public, private, or protected, the target node scope 614 is protected, and the first attribute scope 630 is public. In this scenario, the first attribute 624 is accessible to nodes within the first node group 604, such as the internal node 618 and the internal inherited node 616, and also to nodes outside of the first node group 604 which are inherited from the target node 612, such as the external inherited node 642 which is within the inherited node group 643 inherited from the first node group 604.

The ninth row of the table 646 (identified by the circled "9") lists the set of access rules when the node group scope 610 is either public, private, or protected, the target node scope 614 is protected, and the first attribute scope 630 is private. In this scenario, the first attribute 624 is not accessible to any nodes either inside or outside of the first node group 604.

The tenth row of the table 646 (identified by the circled "10") lists the set of access rules when the node group scope 610 is either public, private, or protected, the target node scope 614 is protected, and the first attribute scope 630 is protected. In this scenario, the first attribute 624 is only accessible to the target node 612 and nodes which inherit from the target node 612—e.g., the internal inherited node 616 and the external inherited node 642 which is within the inherited node group 643 inherited from the first node group 604.

The set of access rules set out in the table 644 and the table 646 thus correspond to a tiered set of access rules for a public contract for determining whether a node is accessible (table 644) and subsequently whether an attribute of the node is accessible (table 646). That is, when determining access for a target attribute of a target node, the access rules for the target node are first applied (according to the rules provided in the table 644) and then the access rules for the target attribute are applied (according to the rules provided in the table 646). Take, as an example, the case of an access request from an external node in relation to an attribute of a public node within a protected node group. This scenario is shown in the seventh row (identified by the circled "7") of the table 644 in FIG. 6B. According to the access rules shown, the contract node 606 is used to provide public access to the public node from requests outside of the protected node group.

The rules described in relation to FIGS. 6B and 6C relate to an example whereby the "internals" of a group (e.g., the target node 612) are exposed outside of the group via a contract having public scope. However, a contract may have private scope or protected scope since a contract is a node. Thus, a private or protected contract may be used to create a contract for internal use within a node group. This may be seen by considering the case whereby the target node 612 shown in FIG. 6A is an internal contract node. As may be seen from FIG. 6B, if the internal contract node has private or protected scope, then it is accessible (and thus usable) by other nodes within the first node group (e.g., the internal node 618) but may not be accessible by external nodes (except in the case of a protected node group with a protected contract node which would be accessible to nodes inherited from the contract node within node groups inherited from the first node group 604). Beneficially, the use of internal contract nodes helps to simplify complex aggregated access for processing in much the same ways as an edge node. The difference being that an edge is used to connect strongly connected nodes and a contract may connect contents of any node (even those have no-direct apparent relationship). Thus, a contract may be considered a type of freeform edge within an executable graph-based model.

Having described the basic functionality of contracts and the application of scope to restrict access to portions of an executable graph-based model, the description will now turn to an example use case incorporating contracts within a graph-based model.

Figure 7:
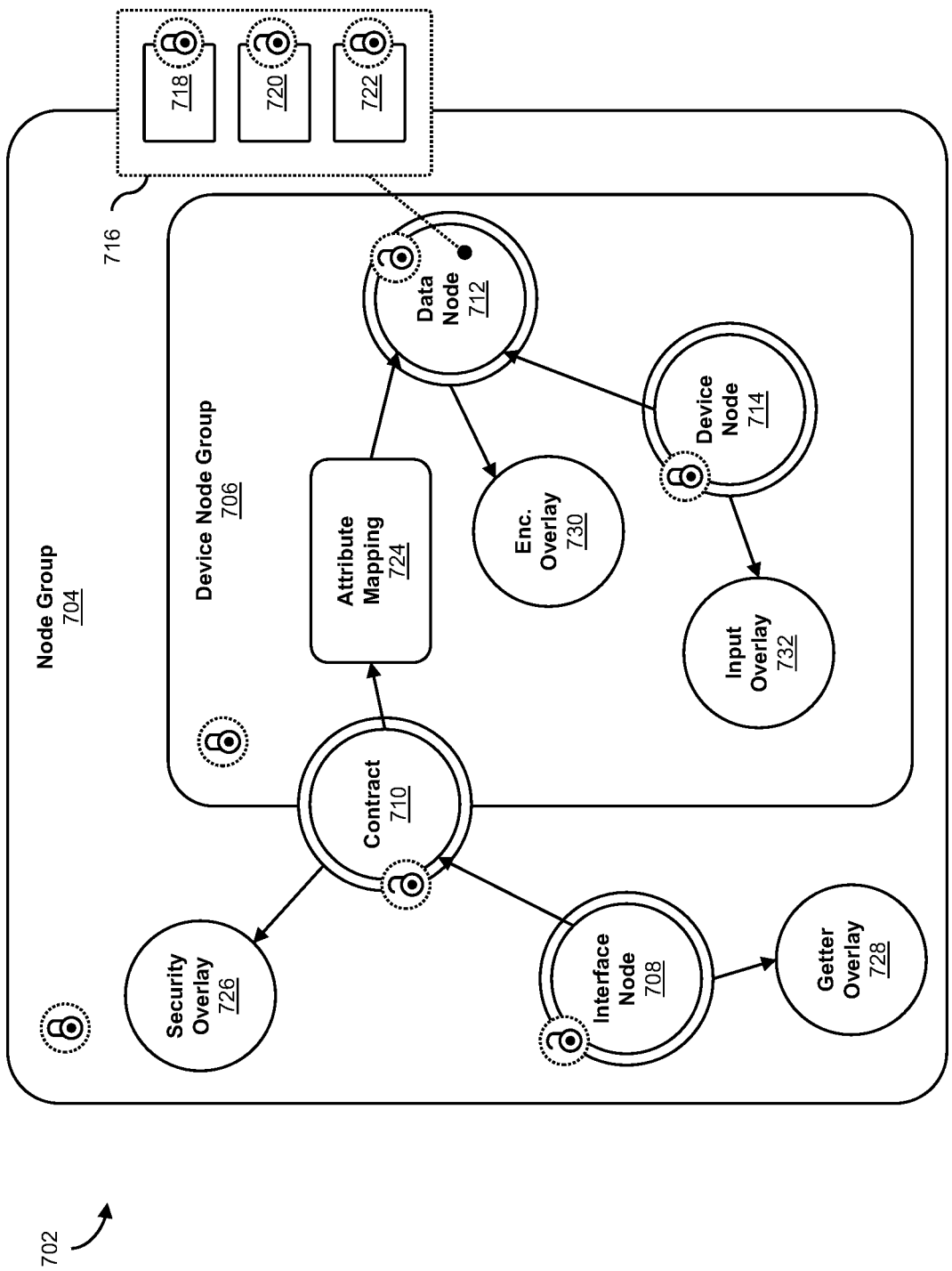
FIG. 7 shows a graph-based model utilizing contracts according to an embodiment of the present disclosure.

FIG. 7 shows a graph-based model 702 utilizing contracts according to an embodiment of the present disclosure.

The graph-based model 702 comprises a node group 704 which comprises a device node group 706. The node group 704 and the device node group 706 have private scope as indicated by the closed padlock icon within each of the node groups in FIG. 7. The node group 704 further comprises an interface node 708 which has public scope, as indicated by the open padlock icon display next to the interface node 708. The device node group 706 has a contract node 710 and comprises a data node 712 and a device node 714. The contract node 710 and the data node 712 have public scope, whilst the device node 714 has private scope. The data node 712 comprises a plurality of attributes 716 including a first attribute 718, a second attribute 720, and a third attribute 722. The first attribute 718 and the third attribute 722 have private scope, whilst the second attribute 720 has public scope. The contract node 710 maps to the second attribute 720 of the data node 712 via an attribute mapping 724. The interface node 708 is an edge node (i.e., a node with an edge node type) which defines a connective relationship to the contract node 710 via a role. The device node 714 is an edge node which defines a connective relationship to the data node 712. The overlay structure of the executable graph-based model comprises a security overlay 726 associated with the contract node 710, a getter overlay 728 associated with the interface node 708, an encryption overlay 730 associated with the data node 712, and an input overlay 732 associated with the device node 714.

The graph-based model 702 shown in FIG. 7 corresponds to a simplified representation of an example graph-based model that may be used to model a medical device. The graph-based model 702 is a configured executable graph-based model, or offline executable graph-based model, because it represents the structure of an executable graph-based model prior to being generated and loaded into memory. An executable graph-based model is generated from the graph-based model 702 upon loading (as will be described in more detail below). The graph-based model 702 models a blood glucose monitoring device. As is known, blood glucose monitoring devices test the concentration of glucose in the blood of a user. The functionality of such devices are outside of the scope of the present disclosure; however, for the purpose of the example shown in FIG. 7, the blood glucose monitoring device obtains a reading of glucose levels within the blood of a user so that the user may be informed in the event of high blood sugar (hyperglycemia) or low blood sugar (hypoglycemia).

The device node group 706 encapsulates the functionality and data relating to interfacing with the blood glucose monitoring device. The device node 714 acts as the interface between the blood glucose monitoring device and the graph-based model 702. More particularly, the input overlay 732 comprises processing logic operable to obtain blood glucose level readings from the blood glucose monitoring device via a suitable interface or gateway (e.g., Bluetooth, WiFi, Universal Serial Bus, etc.). Blood glucose level readings are periodically obtained by the device node 714 and provided to the data node 712 for storage. The data node 712 stores the user's most recent blood glucose level reading as the second attribute 720 of the plurality of attributes 716. The data node 712 uses processing logic in the encryption overlay 730 to encrypt and decrypt the values of the plurality of attributes 716 on saving and loading respectively.

The interface node 708 receives requests to get the most recent blood glucose level reading (e.g., for display to a user or for further processing/analysis). The getter overlay 728 associated with the interface node 708 comprises processing logic operable to handle such requests. However, the device node group 706 is private (i.e., has private scope) meaning that the device node group 706 is a "black box" for nodes outside of the device node group 706 such as the interface node 708. That is, whilst the nodes and relationships within the device node group 706 are shown in FIG. 7, from the perspective of an external node such as the interface node 708, none of the data or functionality contained within the device node group 706 is visible. The contract node 710 enables and controls external access to the blood glucose monitoring data stored within the device node group 706. That is, the contract node 710 comprises a representation of the most recent blood glucose level reading (i.e., the second attribute 720 of the data node 712) obtained via the attribute mapping 724. Thus, the interface node 708 obtains the most recent blood glucose level reading from the contract node 710 without the data node 712 or the second attribute 720 being exposed to the external node.

The contract node 710 utilizes the security overlay 726 to determine if a request (e.g., from the interface node 708) satisfies the security requirements of the contract node 710.

In use, a stimulus and associated context associated with obtaining the most recent blood glucose level are received by the interface node 708. The getter overlay 728 of the interface node 708 comprises processing logic which handles such a request. The processing logic forwards a request (i.e., stimulus and associated context) to the contract node 710 to obtain the most recent blood glucose reading. The contract node 710 causes the processing logic of the security overlay 726 to be executed to determine if the received request has sufficient privileges to process the request. For example, the security overlay 726 may determine from the associated context if the user associated with the stimulus has the access permissions to obtain such data. If the security overlay 726 deems that permission should not be granted, then the contract node 710 returns an outcome to the processing logic of the getter overlay 728 indicating that permission has been denied. If the security overlay 726 deems that access should be granted, then the attribute mapping 724 obtains the state for the mapped attribute (i.e., the attribute value for the second attribute 720) and updates the corresponding attribute value of the contract node 710 based on the obtained state. The contract node 710 has no persisted state for the mapped attribute (i.e., the second attribute 720) locally as the attribute is not owned by the contract node 710. Put another way, each time the contract node 710 is executed, the current state of the second attribute 720 is obtained. The interface node 708, via the getter overlay 728, is then able to obtain the updated attribute value from the contract node 710.

In one embodiment, the device node group 706 is not loaded in memory when the stimulus is received at the contract node 710 from the interface node 708. As such, the requisite parts of the device node group 706 are loaded into memory to provide the required outcome. As stated above in relation to FIG. 5B, a contract node maintains a list of all nodes within a node group which are associated with the contract. In this instance, the contract node 710 is associated via the attribute mapping 724 with the data node 712 such that the unique identifier of the data node 712 is maintained by the contract node 710. To process the request, the data node 712 is loaded (as an executable node with the encryption overlay 730) and the attribute mapping 724 is used to map the (decrypted) value of the second attribute 720 of the data node 712 to the representation thereof within the contract node 710. Therefore, not all nodes within the device node group 706 need to be loaded to handle the request (i.e., the device node 714 and the input overlay 732 remain unloaded as they are not a part of the contract node 710). The "on-demand" loading of nodes associated with a contract provides improvements to the use of computing resources by reducing the memory requirements and maintaining in memory only those elements of an executable graph-based model that are required at a given time.

The visualizations of the executable graph-based model 602 and the graph-based model 702 shown in FIGS. 6A and 7 respectively correspond to a visual representation of various elements within such models. However, in both examples, all elements within the models are displayed regardless of the scope associated with each element (e.g., the scope associated with a node, a node group, etc.). As will be described in more detail below in relation to FIGS. 8A to 8C, scope may be used to restrict a user's view of an executable graph-based model thereby improving security and privacy by ensuring consistency between the user's access privileges and the level of visualization provided to the user.

Figure 8A:
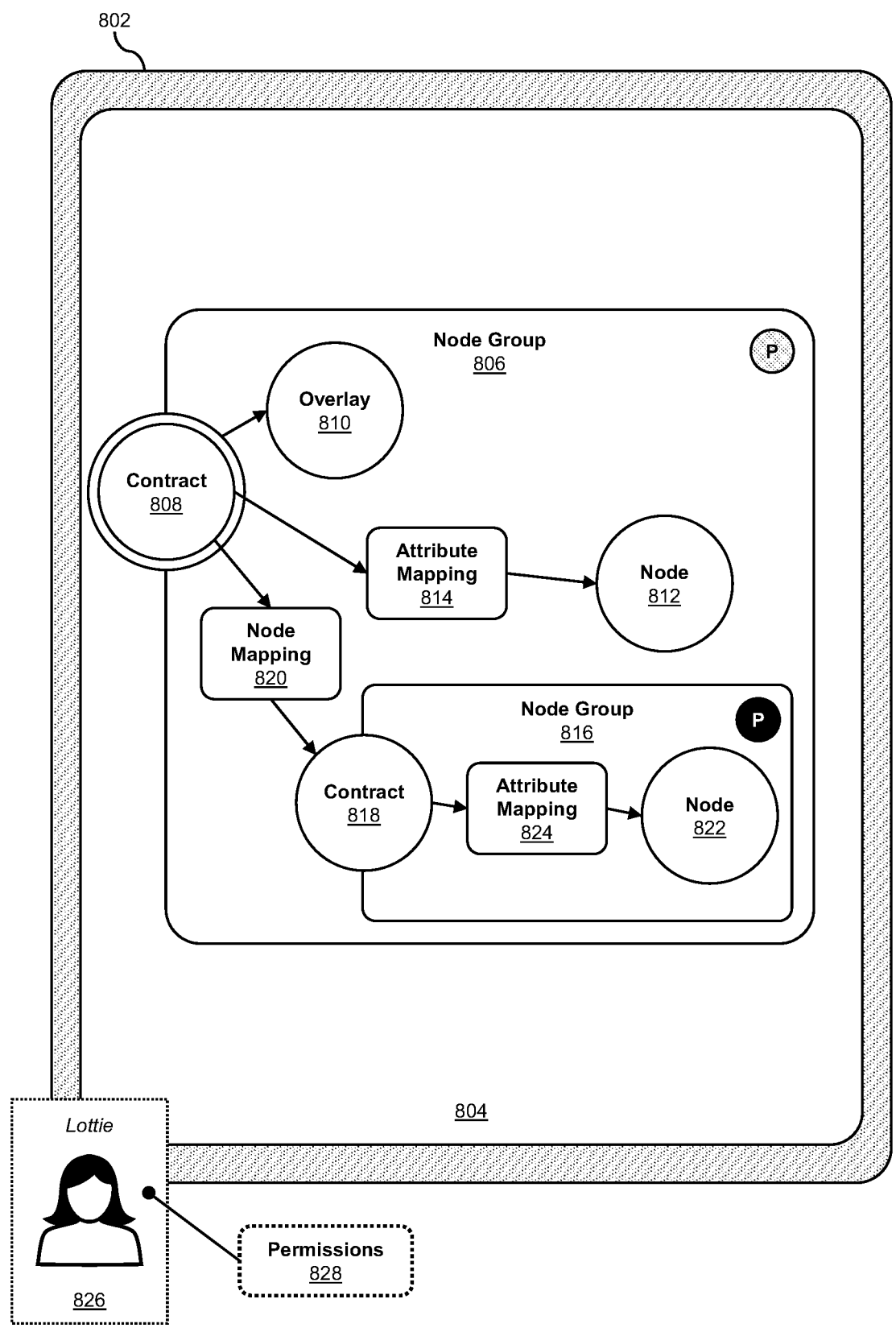
FIGS. 8A-8C show examples of scope-based visualizations of an executable graph-based model according to embodiments of the present disclosure.

FIG. 8A shows a first example of scope-based visualization of an executable graph-based model according to an embodiment of the present disclosure.

FIG. 8A shows a device 802 upon which a graphical user interface 804 is displayed. The graphical user interface 804 comprises various display elements which provide visual representations of components, or parts, of an executable graph-based model being visualized. For brevity, the mention of display elements has been dropped from the following description of the graphical user interface 804. However, the skilled person will appreciate that references to the components, or parts, of the executable graph-based model shown within the graphical user interface 804 correspond to references to display elements associated with those parts (e.g., a reference to a node shown in the graphical user interface 804 should be interpreted as a reference to a display element of the graphic user interface 804 associated with the node).

A first node group 806 is shown within the graphical user interface 804. The first node group 806 has a first contract node 808 (i.e., a contract) which is an executable node associated with an overlay node 810. The first node group 806 comprises a first node 812 which has one or more attributes mapped to the first contract node 808 via a first attribute mapping 814. The first node group 806 further comprises a second node group 816 which has a second contract node 818. The second contract node 818 is mapped to the first contract node 808 via a node mapping 820. The second node group 816 comprises a second node 822 which has one or more attributed mapped to the second contract node 818 via a second attribute mapping 824.

The first node group 806 has protected scope—as indicated by the letter "P" within a gray circle in FIG. 8A—whilst the second node group 816 has private scope—as indicated by the letter "P" within a black circle in FIG. 8A. These visual indicators scope do not necessarily form a part of the graphical user interface 804 and are merely overlaid the graphic user interface 804 in FIG. 8A for illustrative purposes.

The graphical user interface 804 corresponds to the user interface presented to a first user 826 who has a first set of permissions 828. The first set of permissions 828 determine which parts of the executable graph-based model are visible to the first user 826. Whilst parts of the executable graph-based model which have public scope are visible to all users, only users with sufficient permissions may view the portions of the executable graph-based model which have private scope or protected scope.

In the example shown in FIG. 8A, the first set of permissions 828 of the first user 826 are such that the first user 826 may view the first node group 806 (which has protected scope) and the second node group 816 (which has private scope).

Figure 8B:
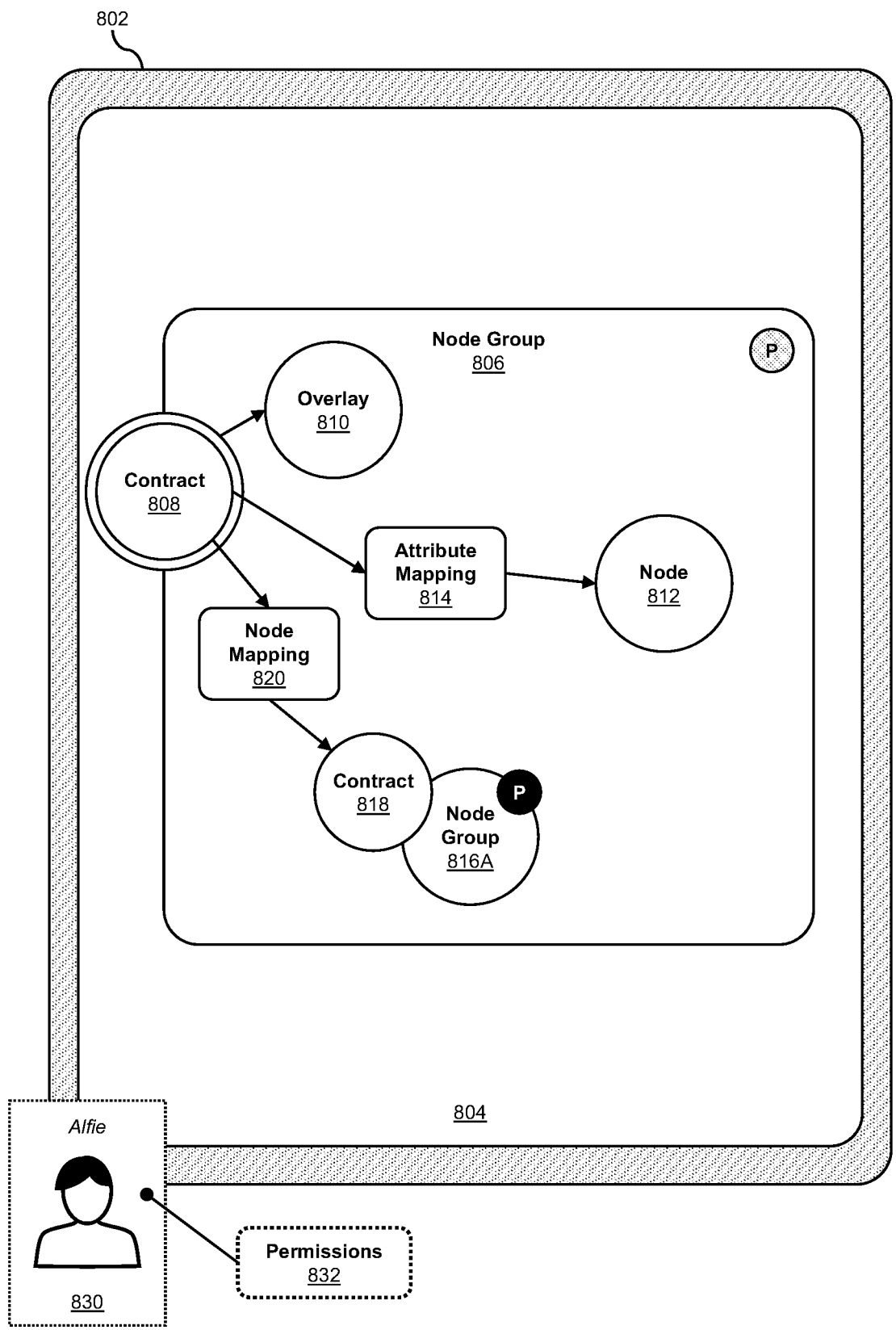

FIG. 8B shows a second example of scope-based visualization of an executable graph-based model according to an embodiment of the present disclosure.

The graphical user interface 804 shown in FIG. 8B corresponds to a view of the executable graph-based model shown in FIG. 8A that is displayed to a second user 830 having a second set of permissions 832.

The second set of permissions 832 are such that the second user 830 is able to view the contents of the first node group 806 (which has protected scope) but the permissions are not sufficient for the second user 830 to view the contents of the second node group 816 shown in FIG. 8A. Instead, the second user 830 is presented with a collapsed representation 816A of the second node group. The collapsed representation 816A provides visual feedback to the second user 830 that the second node group is a part of the executable graph-based model but does not reveal the structure and functionality of the second node group as the second user 830 does not have sufficient privileges to view this content. The relationship between the second node group (as represented by the collapsed representation 816A) and the second contract node 818 is visually represented in the graphical user interface 804 shown in FIG. 8B by the second contract node 818 partially overlapping the collapsed representation 816A of the second node group. In this way, the second user 830 is provided with a visual indication that the second node group is associated with the second contract node 818 without revealing the mechanics of the mappings the second contract node 818 makes within the second node group.

Figure 8C:
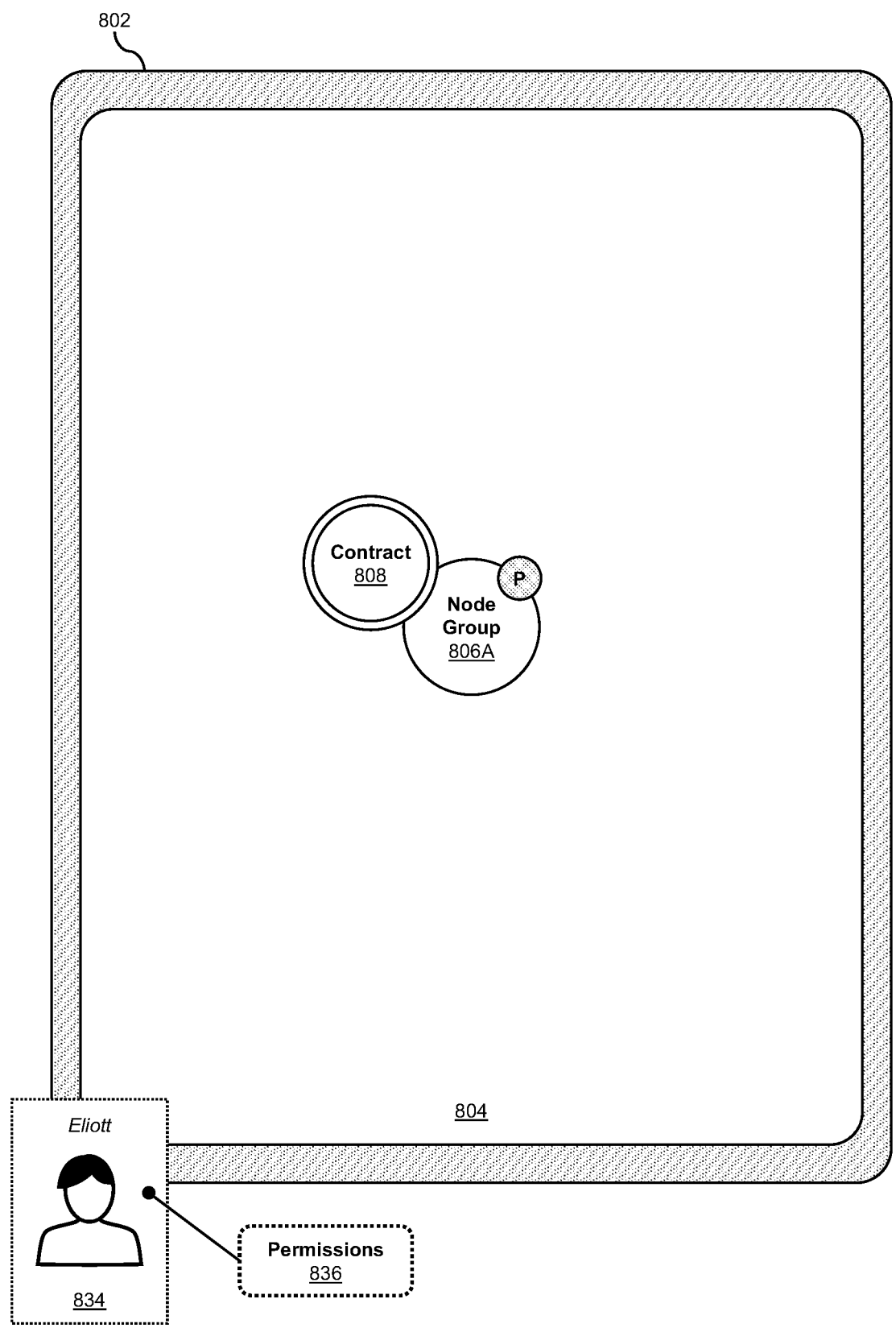

FIG. 8C shows a third example of scope-based visualization of an executable graph-based model according to an embodiment of the present disclosure. The graphical user interface 804 shown in FIG. 8C corresponds to a view of the executable graph-based model shown in FIG. 8A that is displayed to a third user 834 having a third set of permissions 836.

The third set of permissions 836 are such that the third user 834 is not able to view the contents of the first node group 806 (which has protected scope) or the contents of the second node group 816 which has private scope. Instead, the third user 834 is shown a collapsed representation 806A of the first node group 80. The collapsed representation 806A provides visual feedback to the third user 834 that the first node group is a part of the executable graph-based model but does not reveal the structure and functionality of the first node group as the third user 834 does not have sufficient privileges to view this content. The relationship between the first node group (as represented by the collapsed representation 806A) and the first contract node 808 is visually represented in the graphical user interface 804 shown in FIG. 8C by the first contract node 808 partially overlapping the collapsed representation 806A of the first node group. Moreover, as the overlay associated with the first contract node 808 is a part of the first node group, the associated overlay (i.e., the overlay node 810 shown in FIG. 8A) is also hidden from the third user 834.

Therefore, as illustrated in FIGS. 8A-8C, the use of scope not only allows access to nodes and/or attributes within an executable graph-based model to be restricted and controlled, but also allows for permission-based, or scope-based, visualization of the executable graph-based model. This helps ensure that only users with sufficient access privileges or permissions may view the non-public portions of an executable graph-based model thereby improving the security of executable graph-based models.

The description will now turn to methods which operate in conjunction with the systems and functionality described above to provide access management using scopes and contracts.

Figure 9:
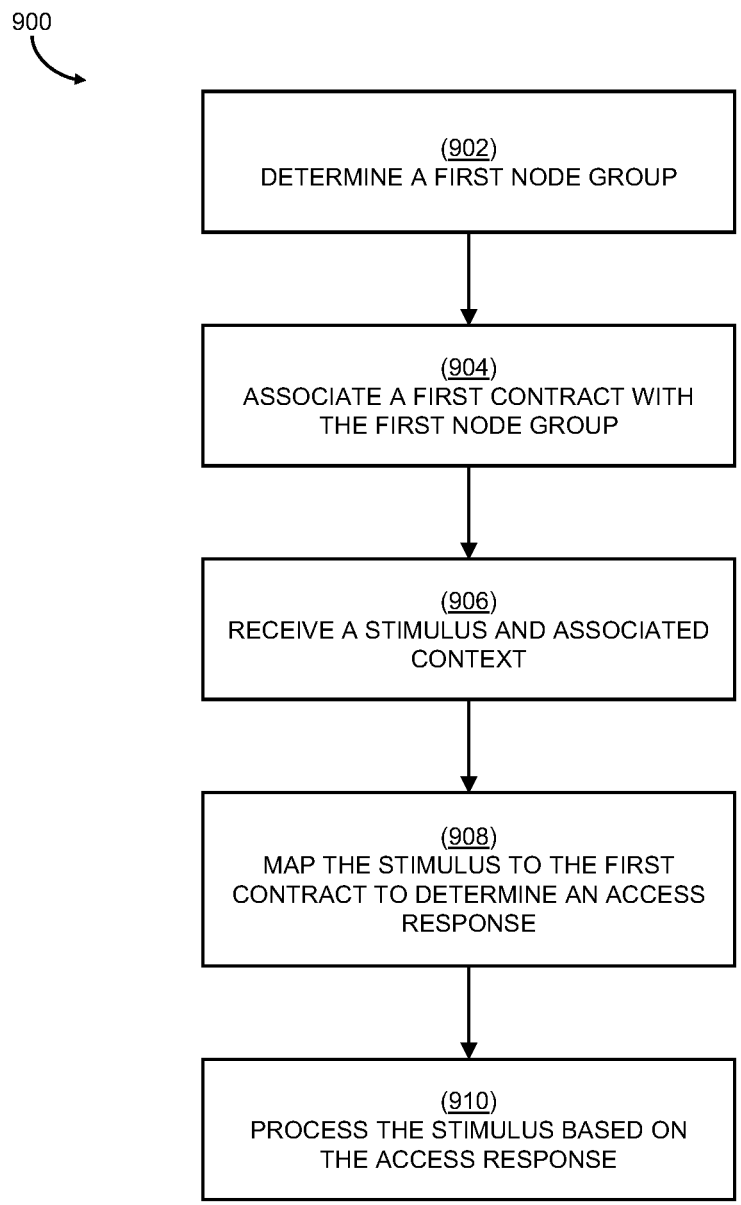
FIG. 9 shows a method for access management in an executable graph-based model according to an embodiment of the present disclosure.

FIG. 9 shows a method 900 for access management in an executable graph-based model according to an embodiment of the present disclosure.

The method 900 comprises the steps of determining 902 a first node group, associating 904 a first contract with the first node group, receiving 906 a stimulus and associated context, mapping 908 the stimulus to the first contract to determine an access response, and processing 910 the stimulus based on the access response. In one embodiment, the method 900 is performed by a system such as the system 300 described above in relation to FIG. 3.

At the step of determining 902, a first node group of an executable graph-based model is determined (e.g., the first node group 604 shown in FIG. 6A). The executable graph-based model comprises a plurality of nodes and an overlay structure comprising processing logic. The first node group comprises at least one node. For example, the first node group may be a graph such that the first node group comprises a hierarchical structure of related nodes. Alternatively, the first node group may be a container such that the first node group comprises an aggregation of related nodes.

As shown in FIG. 5B, when the first node group is not yet loaded, the first node group is determined by identifying a contract node associated with the node group (e.g., by means of the contract identifier 538 shown in FIG. 5B). For example, a request or stimulus may be received which is mapped to a contract identifier (e.g., by a stimuli management module such as the stimuli management module 312 of the system 300 in FIG. 3) thereby identifying the requisite contract node. The contract node associated with the node group maintains a reference to all nodes associated with the contract (e.g., the contract node 534 in FIG. 5B maintains a reference to the unique node identifier 548 of the node 544) which, in turn, comprise references to the node groups which contain the nodes (e.g., the node 544 in FIG. 5B maintains a reference to the unique group identifier 558 of the node group node 554). More details regarding the loading of contract nodes, nodes, and node groups are provided in relation to FIGS. 11 and 12 below.

At the step of associating 904, a first contract is associated with the first node group such that the first contract is configured to act as a proxy for one or more nodes within the first node group in relation to requests from outside the first node group (e.g., the contract node 606 is associated with the first node group 604 and acts as a proxy for external access to the target node 612 in relation to requests from outside the first node group 604).

As stated above, the first contract is the contract used to determine (identify) the first node group. The first contract is a node within the executable graph-based model. In one embodiment, the first contract is an executable node comprising an overlay comprising processing logic operable to interact with the first contract. For example, the overlay may comprise processing logic defining security functionality in relation to access requirements for accessing the first contract. Because each contract within an executable graph-based model is a node, the first contract may be configured to act as a proxy for a second contract, associated with a second node group, foin relation to requests from outside of the first node group. In one embodiment, the first contract comprises a contract behavior.

As stated above in relation to FIGS. 6A-6C, according to an embodiment of the present disclosure each node within an executable graph-based model comprises a scope of a predetermined plurality of scopes, including public scope, private scope, and protected scope. The first contract acts as a proxy to one or more public nodes within the first node group, even if the first node group has private or protected scope. Additionally, or alternatively, the first contract acts as a proxy to one or more public attributes of a public node within the first node group, even if the first node group has private or protected scope. The first contract may also define its own state (e.g., data and functionality) not associated with a connecting node because the first contract is itself a node within the executable graph-based model. As stated in more detail above in relation to FIG. 6A, the first contract provides access to public nodes and/or public attributes via the use of node and/or attribute mappings. The scope of the contract, the scope of the first node group, and the scope of nodes within the first node group determine whether a respective node or attribute is accessible from both inside and outside of the first node group. When the first node group has public scope, a public node within the first node group is directly accessible and the first contract may be used to control access to the public node. When the first node group has public scope, a private node within the first node group is not accessible from outside of the first node group. When the first node group has public scope, a protected node within the first node group is only accessible to nodes inherited from the protected node and nodes within a second node group which is inherited from the first node group.

When the first node group has private scope, a public node within the first node group is not accessible from outside of the first node group, and the first contract acts as a proxy for the public node in relation to requests from outside of the first node group. When the first node group has private scope, a private node within the first node group is not accessible from outside of the first node group. When the first node group has private scope, a protected node within the first node group is only accessible to nodes outside of the first node group which are inherited from the protected node and nodes within a second node group which is inherited from the first node group.

When the first node group has protected scope, a public node within the first node group is not accessible to non-inherited nodes outside of the first node group. In this instance, the first contract acts as a proxy for the public node in relation to requests from outside of the first node group. When the first node group has protected scope, a private node within the first node group is not accessible to nodes outside of the first node group. When the first node group has protected scope, a protected node within the first node group is only accessible to nodes outside of the first node group which are inherited from the private node and nodes within a second node group which is inherited from the first node group.

In one embodiment, when the first node group comprises a public node comprising at least one public attribute having public scope, the first contract is configured to act as a proxy for the at least one public attribute of the public node. The first contract comprises a proxy attribute mapped to the at least one public attribute of the public node via a respective node attribute mapping. In an embodiment, the public node comprises a plurality of public attributes such that the at least one public attribute associated with the first contract is part of a subset of the plurality of public attributes.

When the first node group comprises a public node comprising at least one protected attribute having protected scope, the at least one protected attribute is only accessible to the public node and nodes which are inherited from the public node. When the first node group comprises a private node comprising at least one public attribute having public scope, the at least one public attribute is only accessible to nodes within the first node group. When the first node group comprises a private node comprising at least one protected attribute having protected scope, the at least one protected attribute is only accessible to the private node and nodes within the first node group which are inherited from the private node. When the first node group comprises a protected node comprising at least one public attribute having public scope, the at least one public attribute is only accessible to nodes within the first node group and nodes inherited from the protected node in an inherited node group. When the first node group comprises a protected node comprising at least one protected attribute having protected scope, the at least one protected attribute is only accessible to the protected node and nodes which are inherited from the protected node. When the first node group comprises a node comprising at least one private attribute having private scope, the at least one private attribute is not accessible from outside of the node.

At the step of receiving 906, a stimulus and a context associated therewith are received. The stimulus is associated with the first contract.

In one embodiment, the stimulus and the context are received from within the system in which the executable graph-based model executes. For example, the stimulus and context are received from another executable node within the executable graph-based model. Alternatively, the stimulus and the context are received from a source outside of the system (e.g., the stimuli 346 and context 342 shown in FIG. 3).

At the step of mapping 908, the stimulus is mapped to the first contract in response to the stimulus being received. In consequence of the step of mapping 908, an access response is determined.

The first contract is a node within the executable graph-based model. In one embodiment, the first contract is an executable node comprising a first overlay such that, at the step of mapping 908, the stimulus is provided to the first overlay to determine the access response. In one embodiment, the first overlay includes processing logic operable to define one or more security privileges of the first contract.

The one or more security privileges may include a list of users that have permission to access the first contract. The one or more security privileges may also include a list of one or more access rights for users permitted to access the first contract. As such, the access response is determined according to the security privileges and the context associated with the stimulus. For example, the context associated with the stimulus may identify the request type and the user associated with the request such that the access response is indicative of whether the user associated with the request has sufficient privileges to perform the request associated with the request type.

At the step of processing 910, the stimulus is processed based on the access response. As will be described in more detail in relation to FIG. 10 below, access to the first contract may be provided or denied based on the stimulus being mapped to the first contract.

Figure 10:
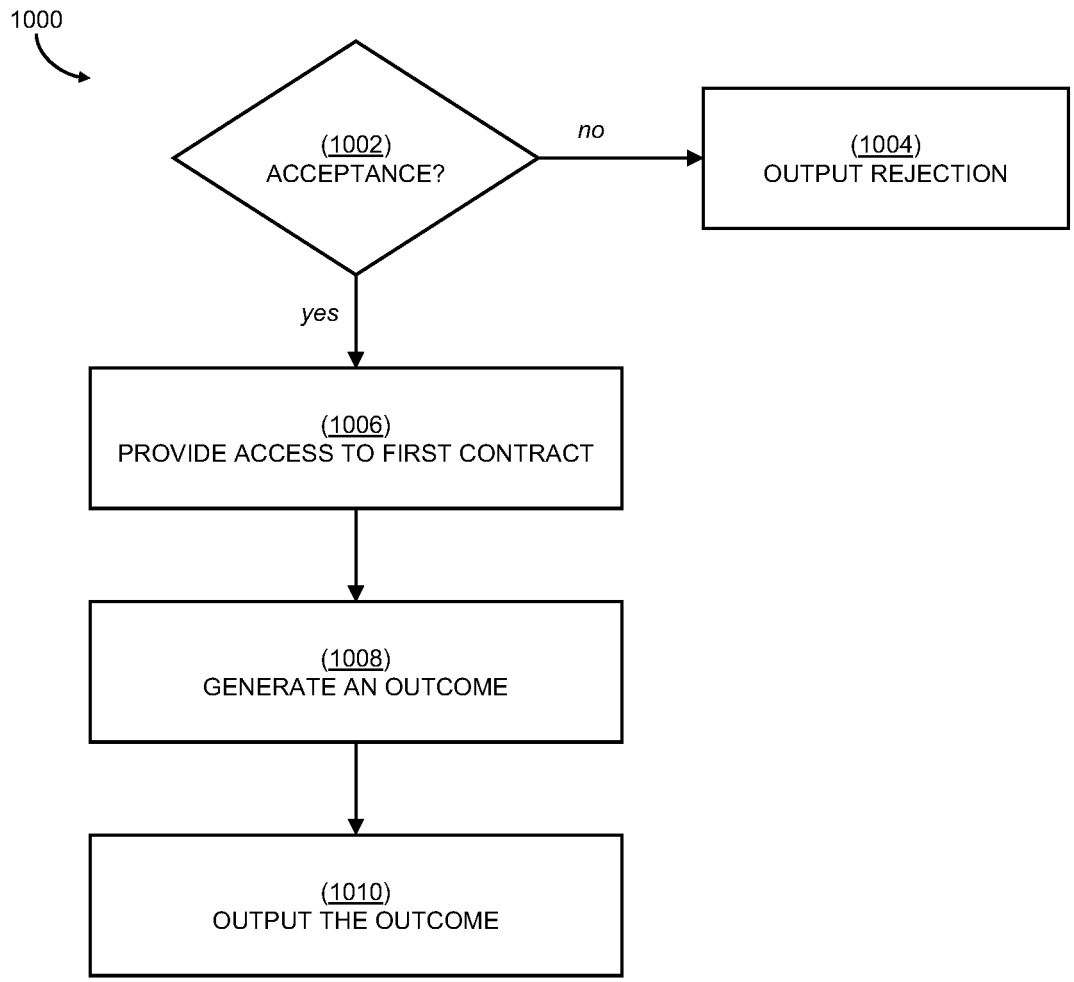
FIG. 10 shows a method for processing an access response according to an embodiment of the present disclosure.

FIG. 10 shows a method 1000 for processing an access response according to an embodiment of the present disclosure.

The method 1000 comprises the steps of determining 1002 a status of an access response, outputting 1004 a rejection when the status is indicative of an access denial, providing 1006 access to the first contract when the status is indicative of an access acceptance, generating 1008 an outcome, and outputting 1010 the outcome. In one embodiment, the method 1000 is performed as part of the operations of the step of processing 910 the stimulus in the method 900 shown in FIG. 9.

At the step of determining 1002, the access response is evaluated to determine whether the access response comprises a rejection notification or an acceptance notification. In one embodiment, the access response is determined by the step of mapping 908 in the method 900 shown in FIG. 9. For example, the access response is determined based on whether the user associated with the stimulus has sufficient privileges to access the first contract.

At the step of outputting 1004, the rejection notification is output when the access response comprises the rejection notification. That is, the step of outputting 1004 is performed when access to the first contract has been denied.

At the step of providing 1006, access to the first contract is provided when the access response comprises the acceptance notification.

At the step of generating 1008, an outcome is generated in accordance with access to the first contract being provided. The outcome may comprise the result of a request associated with the stimulus and associated context received at the step of receiving 906 in the method 900. For example, if the stimulus relates to a request for an attribute held by the first contract, then the outcome generated at the step of generating 1008 would correspond to the requested attribute value.

At the step of outputting 1010, the outcome is output. The outcome may be output to an overlay within the executable graph-based model, a unit within the system which manages the executable graph-based model (e.g., the system 300 shown in FIG. 3), or output to one or more systems or devices external to the system.

Figure 11:
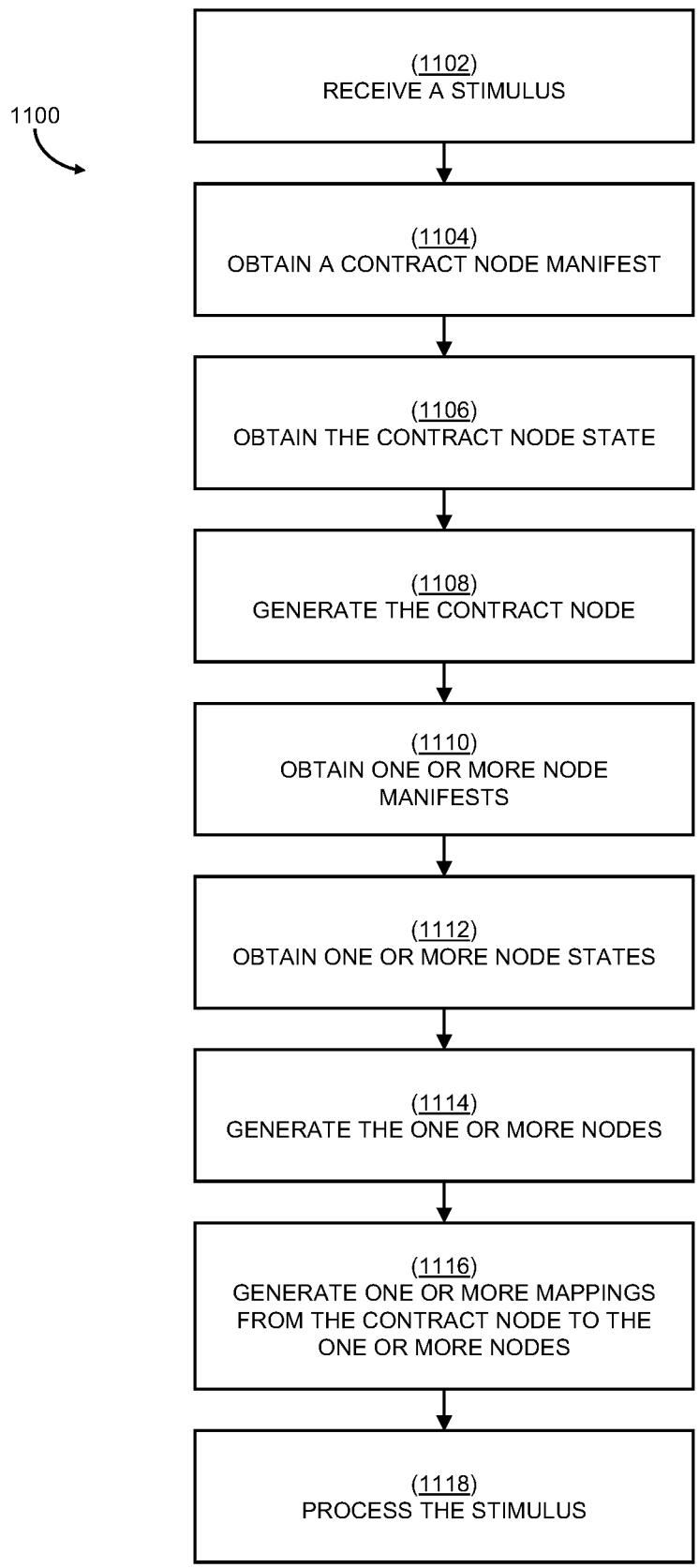
FIG. 11 shows a method for contract-based loading of executable graph-based models according to an embodiment of the present disclosure.

FIG. 11 shows a method 1100 for contract-based loading of executable graph-based models according to an embodiment of the present disclosure.

The method 1100 comprises the steps of receiving 1102 a stimulus, obtaining 1104 a contract node manifest, obtaining 1106, the contract node state, generating 1108 the contract node, obtaining 1110 one or more node manifests, obtaining 1112 one or more node states, generating 1114 the one or more nodes, generating 1116 one or more mappings from the contract node to the one or more nodes, and processing 118 the stimulus. In one embodiment, the method 1100 is performed by a system such as the system 300 described above in relation to FIG. 3.

At the step of receiving 1102, a stimulus and an associated context are received. The stimulus is associated with a contract node having a contract identifier (e.g., the contract identifier 538 shown in FIG. 6B). In one embodiment, the stimulus comprises the contract identifier thereby directly identifying the contract node. In an alternative embodiment, the contract identifier is identified from the stimulus by a stimuli management module such as the stimuli management module 312 of the system 300 in FIG. 3. In this way, the contract identifier is not exposed.

At the step of obtaining 1104, a contract node manifest associated with the contract node is obtained based on the contract identifier (e.g., the manifest 540 shown in FIG. 5B). The contract node manifest comprises the contract identifier, a first storage location associated with a contract node state (e.g., the manifest state 542 shown in FIG. 5B), and one or more node identifiers of one or more nodes associated with the contract node (e.g., the unique node identifier 548 shown in FIG. 5B).

In one embodiment, the contract node is obtained from a contract node manifest state which comprises the contract identifier (e.g., the manifest state 542 shown in FIG. 5B).

At the step of obtaining 1106, the contract node state is obtained from the first storage location. For example, if the first storage location comprises a local file path, then the contract node state is loaded from the local file path. Alternatively, if the first storage location comprises a remote file location (e.g., as represented by a Uniform Resource Locator, URL), then the node state is obtained or downloaded from the remote file location.

At the step of generating 1108, the contract node is generated based on the contract node manifest and the contract node state (e.g., the contract node 534 in FIG. 5B is generated from the manifest 540 and the state 536).

At the step of obtaining 1110, one or more node manifests associated with the one or more nodes are obtained based on the one or more node identifiers (e.g., the manifest 550 shown in FIG. 5B is obtained based on the unique node identifier 548). Each of the one or more node manifests comprises a respective node identifier of the one or more node identifiers and a storage location associated with a respective node state (e.g., the node state 546).

In one embodiment, the one or more node manifests are obtained from one or more node manifests each of which comprising the respective node identifier (e.g., the manifest state 552 in FIG. 5B which comprises the unique node identifier 548).

At the step of obtaining 1112, one or more node states are obtained for the one or more nodes. Each node state is obtained from the storage location associated with the respective node state. For example, if the first storage location comprises a local file path, then the node state is loaded from the local file path. Alternatively, if the first storage location comprises a remote file location (e.g., as represented by a Uniform Resource Locator, URL), then the node state is obtained or downloaded from the remote file location.

At the step of generating 1114, the one or more nodes are generated based on the one or more node manifests and the one or more node states (e.g., the node 544 in FIG. 5B is generated from the manifest 550 and the node state 546).

At the step of generating 1116, one or more mappings from the contract node to the one or more nodes are generated such that the contract node acts as a proxy for the one or more nodes. The one or more mappings may include a node mapping or an attribute mapping.

At the step of processing 1118, the stimulus is processed based on the contract node. In one embodiment, the stimulus is processed using a method such as that described in relation to FIG. 10 above.

Figure 12:
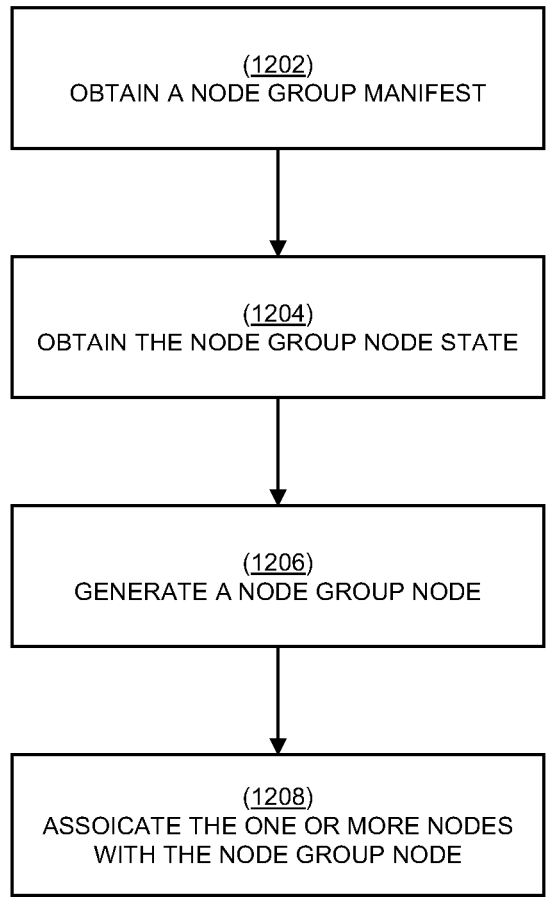
FIG. 12 shows a method for loading a node group according to an embodiment of the present disclosure.

FIG. 12 shows a method 1200 for loading a node group according to an embodiment of the present disclosure.

The method 1200 comprises the steps of obtaining 1202 a node group manifest, obtaining 1204 the node group state, generating 1206 a node group node, and associating 1208 the one or more nodes with the node group node. In one embodiment, the method 1200 is performed as part of the method 1100 shown in FIG. 11.

At the step of obtaining 1202, a node group manifest associated with a node group node is obtained based on a node group identifier (e.g., the manifest 560 associated with the unique node group identifier 558 in FIG. 5B). The node group manifest comprises the node group identifier and a second storage location associated with a node group node state (e.g., the node state 556 shown in FIG. 5B).

In one embodiment, the node group manifest is obtained from a node group manifest state which comprises the node group identifier (e.g., the manifest state 562 in FIG. 5B which comprises the unique node group identifier 558).

At the step of obtaining 1204, the node group node state is obtained from the second storage location. For example, if the first storage location comprises a local file path, then the state is loaded from the local file path. Alternatively, if the first storage location comprises a remote file location (e.g., as represented by a Uniform Resource Locator, URL), then the state is obtained or downloaded from the remote file location.

At the step of generating 1206, a node group node is generated based on the node group manifest and the node group node state (e.g., the node group node 554 in FIG. 5B is generated from the manifest 540 and the node state 556).

At the step of associating 1208, the one or more nodes are associated with the node group node thereby generating the node group.

The skilled person will appreciate from the method 1100 and the method 1200 shown in FIGS. 11 and 12 respectively that all dependencies in relation to a node, a node group, and a contract node are loaded hierarchically due to the hierarchical nature of the manifest structure in which nodes are persisted (as explained in detail in relation to FIGS. 5A and 5B above).

Figure 13:
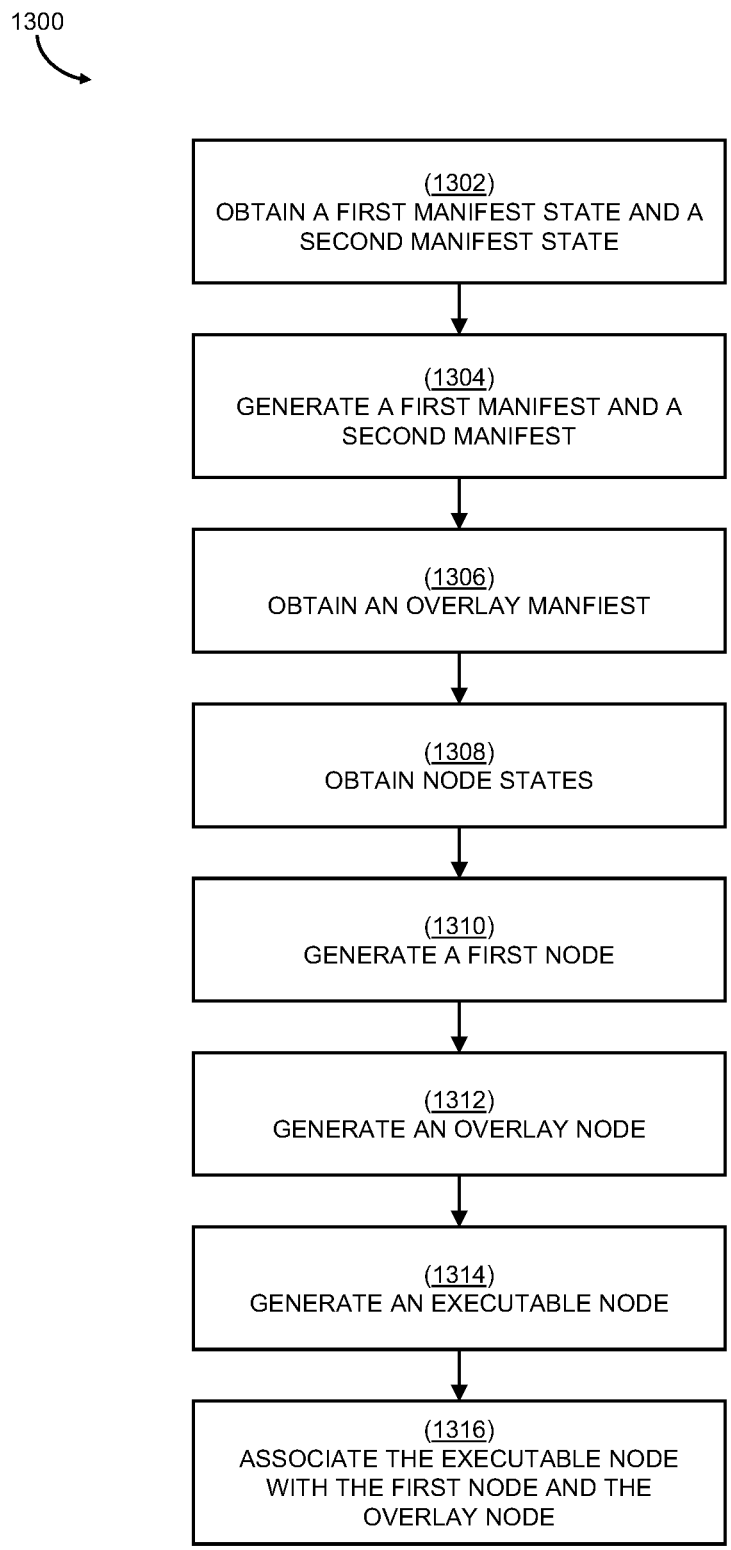
FIG. 13 shows a method for loading an executable node according to an embodiment of the present disclosure.

FIG. 13 shows a method 1300 for loading an executable node according to an embodiment of the present disclosure.

The method 1300 comprises the steps of obtaining 1302 a first manifest state and a second manifest state, generating 1304 a first manifest and a second manifest, obtaining 1306 an overlay manifest, obtaining 1308 node states, generating 1310 a first node, generating 1312 an overlay node, generating 1314 an executable node, and associating 1316 the executable node with the first node and the overlay node. In one embodiment, the method 1300 is performed by a system such as the system 300 described in more detail above in relation to FIG. 3.

At the step of obtaining 1302, a first manifest state and a second manifest state are obtained based on a first, shared, identifier. Both the first manifest state and the second manifest state comprise the first identifier. The first manifest state is associated with a first node and the second manifest state is associated with an executable node. The executable node comprises a composition of the first node and an overlay node.

At the step of generating 1304, a first manifest and a second manifest are generated from the first manifest state and the second manifest state respectively. The first manifest comprises the first identifier and a first node state storage location associated with the location at which a node state for the first node is stored (e.g., the manifest 522 and the identifier 530 shown in FIG. 5A). The second manifest comprises the first identifier, an overlay identifier, and a second node state storage location (e.g., the manifest 520, the identifier 526, and the overlay identifier 528 shown in FIG. 5A). The second node state storage location is associated with the location at which a node state for the executable node is stored. The overlay identifier is associated with an overlay manifest, or overlay manifest state, associated with the overlay node (e.g., the overlay identifier 528 of the manifest 520 shown in FIG. 5A is the same as the identifier 532 of the manifest 524 associated with the overlay node 506).

At the step of obtaining 1306, an overlay manifest is obtained based on the overlay identifier. The overlay manifest comprises the overlay identifier and overlay node state storage location (e.g., the manifest 524 and the identifier 532 shown in FIG. 5A). In one embodiment, the overlay manifest is obtained by first obtaining an overlay manifest state based on the overlay identifier and subsequently generating the overlay manifest based on the overlay manifest state.

At the step of obtaining 1308, a first node state is obtained from the first node state storage location (e.g., the state 512 shown in FIG. 5A), a second node state is obtained from the second node state storage location (e.g., the state 508 shown in FIG. 5A), and an overlay node state is obtained from the overlay node state storage location (e.g., the state 516 shown in FIG. 5A).

At the step of generating 1310, the first node is generated based on the first manifest and the first node state (e.g., the base node 54 shown in FIG. 5A is generated based on the manifest 522 and the state 512).

At the step of generating 1312, the overlay node is generated based on the overlay manifest and the overlay node state (e.g., the overlay node 506 shown in FIG. 5A is generated from the manifest 524 and the state 516).

At the step of generating 1314, the executable node is generated based on the second manifest and the second node state (e.g., the executable node 502 is generated from the manifest 520 and the state 508).

At the step of associating 1316, the executable node is associated with the first node and the overlay node (e.g., the composition of the base node 504 and the overlay node 506 which forms the executable node 502 shown in FIG. 5A).

Figure 14:
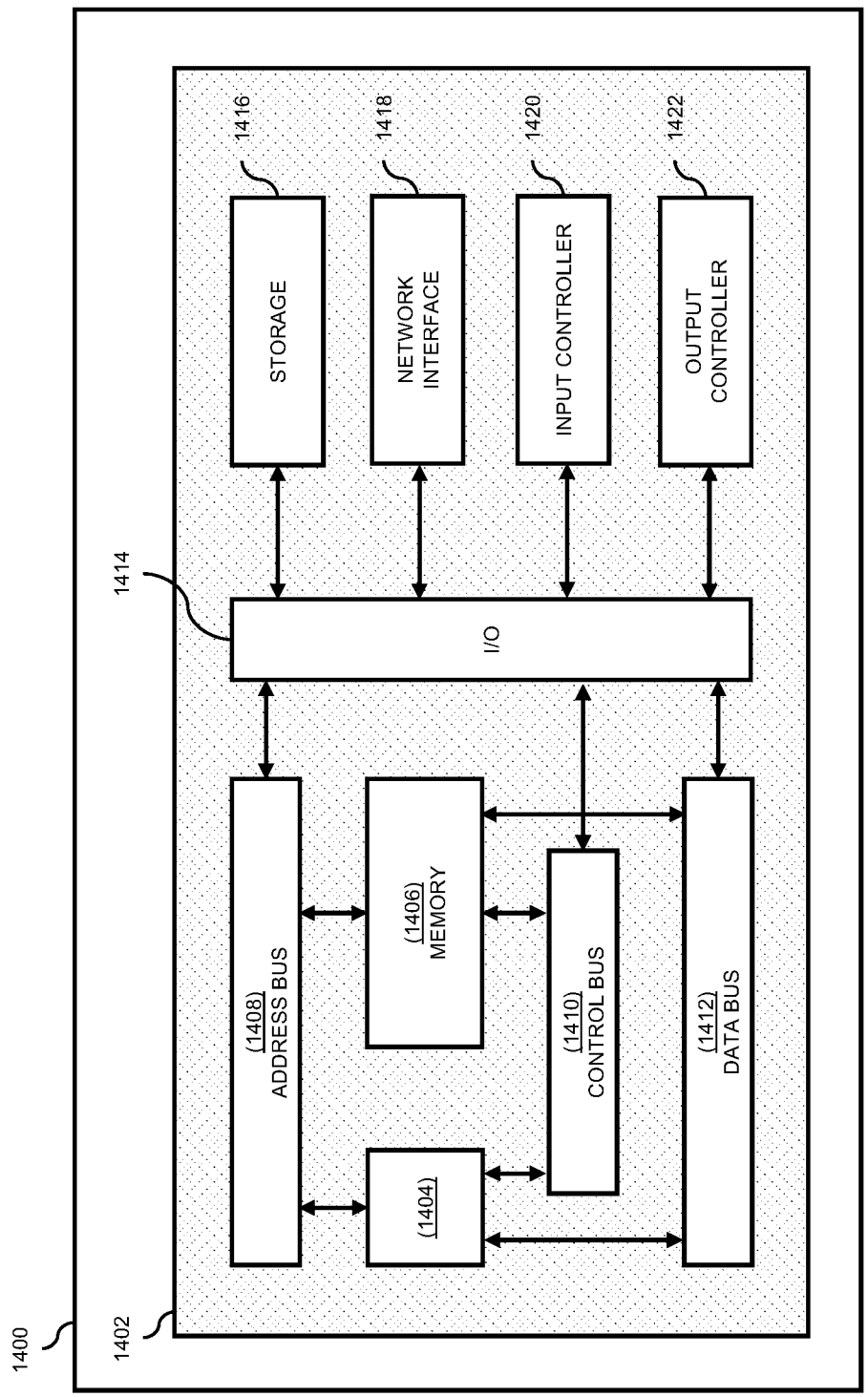
FIG. 14 shows an example computing system for carrying out the methods of the present disclosure.

FIG. 14 shows an example computing system for carrying out the methods of the present disclosure. Specifically, FIG. 14 shows a block diagram of an embodiment of a computing system according to example embodiments of the present disclosure.

Computing system 1400 may be configured to perform any of the operations disclosed herein such as, for example, any of the operations discussed with reference to the functional modules described in relation to FIG. 1A. The computing system 1400 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1400 is a distributed system configured to function using multiple computing machines interconnected via a data network or bus system.

The computing system 1400 includes one or more computing device(s) 1402. The one or more computing device(s) 1402 of computing system 1400 comprise one or more processors 1404 (or processing circuitry) and memory 1406. The terms "processor" and "processing circuitry" are used interchangeably throughout the disclosure. The one or more processors 1404 may be any general purpose processor(s) configured to execute a set of instructions. For example, one or more processors 1404 may be a processor core, a multi-processor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/microcontroller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 1404 include one processor. Alternatively, one or more processors 1404 include a plurality of processors that are operatively connected. For example, the one or more processors 1404 may be multiple processing units, a single processing core, multiple processing cores, special purpose processing cores, co-processors, or any combination thereof. One or more processors 1404 are communicatively coupled to memory 1406 via address bus 1408, control bus 1410, and data bus 1412.

Memory 1406 may include non-volatile memories such as read-only memory ("ROM"), programmable read-only memory ("PROM"), erasable programmable read-only memory ("EPROM"), flash memory, or any other device capable of storing program instructions or data with or without applied power. The memory 1406 may also include volatile memories, such as random-access memory ("RAM"), static random-access memory ("SRAM"), dynamic random-access memory ("DRAM"), and synchronous dynamic random-access memory ("SDRAM"). The memory 1406 may comprise single or multiple memory modules. While the memory 1406 is depicted as part of the one or more computing device(s) 1402, the skilled person will recognize that the memory 1406 may be separate from the one or more computing device(s) 1402.

Memory 1406 may store information that may be accessed by one or more processors 1404. For instance, memory 1406 (e.g., one or more non-transitory computer-readable storage mediums, memory devices) may include computer-readable instructions (not shown) that may be executed by one or more processors 1404. The computer-readable instructions may be software written in any suitable programming language or may be implemented in hardware. Additionally, or alternatively, the computer-readable instructions may be executed in logically and/or virtually separate threads on one or more processors 1404. For example, memory 1406 may store instructions (not shown) that when executed by one or more processors 1404 cause one or more processors 1404 to perform operations such as any of the operations and functions for which computing system 1400 is configured, as described herein. In addition, or alternatively, memory 1406 may store data (not shown) that may be obtained, received, accessed, written, manipulated, created, and/or stored. The data may include, for instance, the data and/or information described herein in relation to FIGS. 1 to 14. In some implementations, the one or more computing device(s) 1402 may obtain from and/or store data in one or more memory device(s) that are remote from the computing system 1400.

The one or more computing device(s) 1402 further comprise I/O interface 1414 communicatively coupled to address bus 1408, control bus 1410, and data bus 1412. The I/O interface 1414 is configured to couple to one or more external devices (e.g., to receive and send data from/to one or more external devices). Such external devices, along with the various internal devices, may also be known as peripheral devices. The I/O interface 1414 may include both electrical and physical connections for operably coupling the various peripheral devices to the one or more computing device(s) 1402. The I/O interface 1414 may be configured to communicate data, addresses, and control signals between the peripheral devices and the one or more computing device(s) 1402. The I/O interface 1414 may be configured to implement any standard interface, such as a small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 1414 is configured to implement only one interface or bus technology. Alternatively, the I/O interface 1414 is configured to implement multiple interfaces or bus technologies. The I/O interface 1414 may include one or more buffers for buffering transmissions between one or more external devices, internal devices, the one or more computing device(s), or the one or more processors 1404. The I/O interface 1414 may couple the one or more computing device(s) 1402 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1414 may couple the one or more computing device(s) 1402 to various output devices, including video displays, speakers, printers, projectors, tactile feedback devices, automation control, robotic components, actuators, motors, fans, solenoids, valves, pumps, transmitters, signal emitters, lights, and so forth.

Computing system 1400 further comprises storage unit 1416, network interface 1418, input controller 1420, and output controller 1422. Storage unit 1416, network interface 1418, input controller 1420, and output controller 1422 are communicatively coupled to the central control unit (i.e., the memory 1406, the address bus 1408, the control bus 1410, and the data bus 1412) via I/O interface 1414. The network interface 1418 communicatively couples the computing system 1400 to one or more networks such as wide area networks ("WAN"), local area networks ("LAN"), intranets, the Internet, wireless access networks, wired networks, mobile networks, telephone networks, optical networks, or combinations thereof. The network interface 1418 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 1416 is a computer readable medium, preferably a non-transitory computer readable medium, comprising one or more programs, the one or more programs comprising instructions which when executed by the one or more processors 1404 cause computing system 1400 to perform the method steps of the present disclosure. Alternatively, storage unit 1416 is a transitory computer readable medium. Storage unit 1416 may include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 1416 stores one or more operating systems, application programs, program modules, data, or any other information. The storage unit 1416 is part of the one or more computing device(s) 1402. Alternatively, the storage unit 1416 is part of one or more other computing machines that are in communication with the one or more computing device(s) 1402, such as servers, database servers, cloud storage, network attached storage, and so forth.

Moreover, for example, the present technology/system may achieve the following configurations:

1. A method for access management in an executable graph-based model, the executable graph-based model comprising a plurality of nodes and an overlay structure comprising processing logic, the overlay structure associated with one or more executable nodes of the plurality of nodes, the method comprising:
  determining, by processing circuitry, a first node group of the executable graph-based model, the first node group comprising at least one node;
  associating, by the processing circuitry, a first contract with the first node group such that the first contract is configured to act as a proxy for one or more nodes within the first node group in relation to requests from outside the first node group;
  receiving, by the processing circuitry, a stimulus and a context associated therewith, wherein the stimulus is associated with the first contract;
  in response to the stimulus being received, mapping, by the processing circuitry, the stimulus to the first contract to determine an access response; and
  processing, by the processing circuitry, the stimulus based on the access response.

2. The method of 1 wherein the first contract is a node of the executable graph-based model.

3. The method of 2 wherein the first contract is an executable node of the executable graph-based model, the executable node comprising a first overlay.

4. The method of 3 wherein the first overlay includes processing logic operable to define one or more security privileges of the first contract, the one or more security privileges of the first contract including a list of users that have permission to access the first contract.

5. The method of 3 wherein the one or more security privileges of the first contract include a list of one or more access rights for users permitted to access the first contract.

6. The method of 3 wherein the access response is determined according to the one or more security privileges of the first contract and the context associated with the stimulus.

7. The method of 6 wherein the access response comprises a rejection notification when the access response is indicative of access to the first contract being denied based on the context.

8. The method of 6 wherein the access response comprises an acceptance notification when the access response is indicative of access to the first contract being approved based on the context.

9. The method of 8 wherein the step of processing the stimulus further comprises:
when the access response comprises the acceptance notification, providing, by the processing circuitry, access to the first contract.

10. The method of 9 further comprising:
generating, by the processing circuitry, an outcome in accordance with access to the first contract being provided; and
outputting, by the processing circuitry, the outcome.

11. The method of 1 wherein each node in the executable graph-based model comprises a scope of a predetermined plurality of scopes.

12. The method of 11 wherein one or more nodes in the executable graph-based model comprise one or more attributes each having a corresponding scope of the predetermined plurality of scopes.

13. The method of 11 wherein the predetermined plurality of scopes includes public scope, private scope, and protected scope.

14. The method of 1 wherein the first node group has public scope.

15. The method of 14 wherein the first node group comprises a public node having public scope such that the first contract is configured to act as a proxy for the public node in relation to requests from outside of the first node group.

16. The method of 15 wherein the first contract comprises a proxy node mapped to the public node via a respective node mapping.

17. The method of 14 wherein the first node group comprises a private node having private scope such that the private node is not accessible from outside of the first node group.

18. The method of 14 wherein the first node group comprises a protected node having protected scope such that the protected node is only accessible to nodes inherited from the protected node and nodes within a second node group which is inherited from the first node group.

19. The method of 1 wherein the first node group has private scope.

20. The method of 19 wherein the first node group comprises a public node having public scope such that the public node is not accessible from outside of the first node group and the first contract acts as a proxy for the public node in relation to requests from outside of the first node group.

21. The method of 20 wherein the first contract comprises a proxy node mapped to the public node via a respective node mapping.

22. The method of 19 wherein the first node group comprises a private node having private scope such that the private node is not accessible from outside of the first node group.

23. The method of 19 wherein the first node group comprises a protected node having protected scope such that the protected node is only accessible to nodes outside of the first node group which are inherited from the protected node and nodes within a second node group which is inherited from the first node group.

24. The method of 1 wherein the first node group has protected scope.

25. The method of 24 wherein the first node group comprises a public node having public scope such that the public node is not accessible to non-inherited nodes outside of the first node group and the first contract acts as a proxy for the public node in relation to requests from outside of the first node group.

26. The method of 25 wherein the first contract comprises a proxy node mapped to the public node via a respective node mapping.

27. The method of 25 wherein the public node is accessible to nodes outside of the first node group which are inherited from the public node and nodes within a second node group which is inherited from the first node group.

28. The method of 24 wherein the first node group comprises a private node having private scope such that the private node is not accessible to nodes outside of the first node group.

29. The method of 24 wherein the first node group comprises a protected node having protected scope such that the protected node is only accessible to nodes outside of the first node group which are inherited from the protected node and nodes within a second node group which is inherited from the first node group.

30. The method of 1 wherein the first node group comprises a public node comprising at least one public attribute having public scope such that the first contract is configured to act as a proxy for the at least one public attribute of the public node.

31. The method of 30 wherein the first contract comprises a proxy attribute mapped to the at least one public attribute of the public node via a respective node attribute mapping.

32. The method of 30 wherein the public node comprises a plurality of attributes such that the at least one public attribute associated with the first contract is part of a subset of the plurality of attributes.

33. The method of 30 wherein the at least one public attribute is accessible to nodes within the first node group.

34. The method of 1 wherein the first node group comprises a public node comprising at least one protected attribute having protected scope such that the at least one protected attribute is only accessible to the public node and nodes which are inherited from the public node.

35. The method of 1 wherein the first node group comprises a private node comprising at least one public attribute having public scope such that the at least one public attribute is only accessible to nodes within the first node group.

36. The method of 1 wherein the first node group comprises a private node comprising at least one protected attribute having protected scope such that the at least one protected attribute is only accessible to the private node and nodes within the first node group which are inherited from the private node.

37. The method of 1 wherein the first node group comprises a protected node comprising at least one public attribute having public scope such that the at least one public attribute is only accessible to nodes within the first node group and nodes inherited from the protected node.

38. The method of 1 wherein the first node group comprises a protected node comprising at least one protected attribute having protected scope such that the at least one protected attribute is only accessible to the protected node and nodes which are inherited from the protected node.

39. The method of 1 wherein the first node group comprises a node comprising at least one private attribute having private scope such that the at least one private attribute is not accessible from outside of the node.

40. The method of 1 wherein the first node group comprises a second contract associated with a second node group.

41. The method of 40 wherein the first contract is configured to act as a proxy for the second contract in relation to requests from outside the first node group.

42. The method of 1 wherein the first contract comprises a contract behavior.

43. The method of 1 wherein the first node group is a container comprising an aggregation of nodes.

44. The method of 1 wherein the first node group is a graph comprising a hierarchical structure of nodes.

45. A system for access management in an executable graph-based model, the executable graph-based model comprising a plurality of nodes and an overlay structure comprising processing logic, the overlay structure associated with one or more executable nodes of the plurality of nodes, the system comprising processing circuitry and a memory unit operatively coupled to the processing circuitry and having instructions stored thereon that, when executed by the processing circuitry, cause the processing circuitry to:
determine a first node group of the executable graph-based model, the first node group comprising at least one node;
associate a first contract with the first node group such that the first contract is configured to act as a proxy for one or more nodes within the first node group in relation to requests from outside the first node group;
receive a stimulus and a context associated therewith, wherein the stimulus is associated with the first contract;
in response to the stimulus being received, map the stimulus to the first contract to determine an access response; and
process the stimulus based on the access response.

46. A non-transitory computer readable medium for access management in an executable graph-based model, the executable graph-based model comprising a plurality of nodes and an overlay structure comprising processing logic, the overlay structure associated with one or more executable nodes of the plurality of nodes, the non-transitory computer readable medium storing instructions which, when executed by processing circuitry, cause the processing circuitry to:
determine a first node group of the executable graph-based model, the first node group comprising at least one node;
associate a first contract with the first node group such that the first contract is configured to act as a proxy for one or more nodes within the first node group in relation to requests from outside the first node group;
receive a stimulus and a context associated therewith, wherein the stimulus is associated with the first contract;
in response to the stimulus being received, map the stimulus to the first contract to determine an access response; and
process the stimulus based on the access response.

47. A method for contract-based loading of executable-graph based models, the method comprising:
receiving, by processing circuitry, a stimulus and an associated context, wherein the stimulus is associated with a contract node having a contract identifier;
obtaining, by the processing circuitry and based on the contract identifier, a contract node manifest associated with the contract node, the contract node manifest comprising the contract identifier, a first storage location associated with a contract node state, and one or more node identifiers of one or more nodes associated with the contract node;
obtaining, by the processing circuitry, the contract node state from the first storage location;
generating, by the processing circuitry, the contract node based on the contract node manifest and the contract node state;
obtaining, by the processing circuitry and based on the one or more node identifiers, one or more node manifests associated with the one or more nodes, wherein each of the one or more node manifests comprises a respective node identifier of the one or more node identifiers and a storage location associated with a respective node state;
obtaining, by the processing circuitry, one or more node states for the one or more nodes, wherein each node state is obtained from the storage location associated with the respective node state;
generating, by the processing circuitry, the one or more nodes based on the one or more node manifests and the one or more node states;
generating, by the processing circuitry, one or more mappings from the contract node to the one or more nodes such that the contract node acts as a proxy for the one or more nodes; and
processing, by the processing circuitry, the stimulus based on the contract node.

48. The method of 47 wherein the contract node manifest is obtained from a contract node manifest state, the contract node manifest state comprising the contract identifier.

49. The method of 47 wherein each of the one or more node manifests are obtained from respective manifest states comprising the respective node identifiers.

50. The method of 47 wherein each of the one or more node manifests further comprise a node group identifier associated with a first node group, the one or more nodes forming part of the first node group.

51. The method of 50 wherein the one or more nodes comprise a subset of all nodes within the first node group.

52. The method of 50 further comprising:
obtaining, by the processing circuitry and based on the node group identifier, a node group manifest associated with a node group node, wherein the node group manifest comprises the node group identifier and a second storage location associated with a node group node state;
obtaining, by the processing circuitry, the node group node state from the second storage location;
generating, by the processing circuitry, a node group node based on the node group manifest and the node group node state; and
associating, by the processing circuitry, the one or more nodes with the node group node thereby generating the node group.

53. The method of 52 wherein the contract node acts as a proxy for the one or more nodes in relation to requests from outside of the node group.

54. The method of 52 wherein the node group manifest is obtained from a node group manifest state, the node group manifest state comprising the node group identifier.

55. The method of 47 wherein the step of processing the stimulus further comprises:

mapping, by the processing circuitry, the stimulus to the contract node to determine an access response; and when the access response comprises an acceptance notification, providing, by the processing circuitry, access to the contract node.

56. The method of 55 further comprising:

generating, by the processing circuitry, an outcome in accordance with access to the contract node being provided; and outputting, by the processing circuitry, the outcome.

57. A system for contract-based loading of executable graph-based models, the system comprising processing circuitry and a memory unit operatively coupled to the processing circuitry and having instructions stored thereon that, when executed by the processing circuitry, cause the processing circuitry to:

receive a stimulus and an associated context, wherein the stimulus is associated with a contract node having a contract identifier;

obtain, based on the contract identifier, a contract node manifest associated with the contract node, the contract node manifest comprising the contract identifier, a first storage location associated with a contract node state, and one or more node identifiers of one or more nodes associated with the contract node;

obtain the contract node state from the first storage location;

generate the contract node based on the contract node manifest and the contract node state;

obtain, based on the one or more node identifiers, one or more node manifests associated with the one or more nodes, wherein each of the one or more node manifests comprises a respective node identifier of the one or more node identifiers and a storage location associated with a respective node state;

obtain one or more node states for the one or more nodes, wherein each node state is obtained from the storage location associated with the respective node state;

generate the one or more nodes based on the one or more node manifests and the one or more node states;

generate one or more mappings from the contract node to the one or more nodes such that the contract node acts as a proxy for the one or more nodes; and process the stimulus based on the contract node.

58. A non-transitory computer readable medium for contract-based loading of executable graph-based models, the non-transitory computer readable medium storing instructions which, when executed by processing circuitry, cause the processing circuitry to:

receive a stimulus and an associated context, wherein the stimulus is associated with a contract node having a contract identifier;

obtain, based on the contract identifier, a contract node manifest associated with the contract node, the contract node manifest comprising the contract identifier, a first storage location associated with a contract node state, and one or more node identifiers of one or more nodes associated with the contract node;

obtain the contract node state from the first storage location;

generate the contract node based on the contract node manifest and the contract node state;

obtain, based on the one or more node identifiers, one or more node manifests associated with the one or more nodes, wherein each of the one or more node manifests comprises a respective node identifier of the one or more node identifiers and a storage location associated with a respective node state;

obtain one or more node states for the one or more nodes, wherein each node state is obtained from the storage location associated with the respective node state;

generate the one or more nodes based on the one or more node manifests and the one or more node states;

generate one or more mappings from the contract node to the one or more nodes such that the contract node acts as a proxy for the one or more nodes; and process the stimulus based on the contract node.

What is claimed is:

1. A method for access management in an executable graph-based model, the executable graph-based model comprising a plurality of nodes and an overlay structure comprising processing logic, the overlay structure associated with one or more executable nodes of the plurality of nodes, the method comprising:

determining, by processing circuitry, a first node group of the executable graph-based model, the first node group comprising at least one node, wherein the first node group has public scope;

associating, by the processing circuitry, a first contract with the first node group such that the first contract is configured to act as a proxy for one or more nodes within the first node group in relation to requests from outside the first node group, wherein the first node group comprises at least one of a group comprising:

(i) a private node having private scope such that the private node is not accessible from outside of the first node group, and (ii) a protected node having protected scope such that the protected node is only accessible to nodes inherited from the protected node and nodes within a second node group which is inherited from the first node group;

receiving, by the processing circuitry, a stimulus and a context associated therewith, wherein the stimulus is associated with the first contract;

in response to the stimulus being received, mapping, by the processing circuitry, the stimulus to the first contract to determine an access response; and processing, by the processing circuitry, the stimulus based on the access response.

2. The method of claim 1 wherein the first contract is a node of the executable graph-based model.

3. The method of claim 2 wherein the first contract is an executable node of the executable graph-based model, the executable node comprising a first overlay.

4. The method of claim 3 wherein the first overlay includes processing logic operable to define one or more security privileges of the first contract, the one or more security privileges of the first contract including a list of users that have permission to access the first contract.

5. The method of claim 4 wherein the one or more security privileges of the first contract include a list of one or more access rights for users permitted to access the first contract.

6. The method of claim 4 wherein the access response is determined according to the one or more security privileges of the first contract and the context associated with the stimulus.

7. The method of claim 6 wherein the access response comprises a rejection notification when the access response is indicative of access to the first contract being denied based on the context.

8. The method of claim 6 wherein the access response comprises an acceptance notification when the access response is indicative of access to the first contract being approved based on the context.

9. The method of claim 8 wherein the step of processing the stimulus further comprises:
when the access response comprises the acceptance notification, providing, by the processing circuitry, access to the first contract.

10. The method of claim 9 further comprising:
generating, by the processing circuitry, an outcome in accordance with access to the first contract being provided; and
outputting, by the processing circuitry, the outcome.

11. The method of claim 1 wherein each node in the executable graph-based model comprises a scope of a predetermined plurality of scopes.

12. The method of claim 11 wherein one or more nodes in the executable graph-based model comprise one or more attributes each having a corresponding scope of the predetermined plurality of scopes.

13. The method of claim 11 wherein the predetermined plurality of scopes include public scope, private scope, and protected scope.

14. The method of claim 1 wherein the first node group further comprises a public node having public scope such that the first contract is configured to act as a proxy for the public node in relation to requests from outside of the first node group.

15. The method of claim 14 wherein the first contract comprises a proxy node mapped to the public node via a respective node mapping.

16. The method of claim 1 wherein the first node group further comprises a public node comprising at least one public attribute having public scope such that the first contract is configured to act as a proxy for the at least one public attribute of the public node.

17. The method of claim 16 wherein the first contract comprises a proxy attribute mapped to the at least one public attribute of the public node via a respective node attribute mapping.

18. The method of claim 16 wherein the public node comprises a plurality of attributes such that the at least one public attribute associated with the first contract is part of a subset of the plurality of attributes.

19. The method of claim 16 wherein the at least one public attribute is accessible to nodes within the first node group.

20. The method of claim 1 wherein the first node group further comprises a public node comprising at least one protected attribute having protected scope such that the at least one protected attribute is only accessible to the public node and nodes which are inherited from the public node.

21. The method of claim 1 wherein the first node group comprises the private node, and wherein the private node comprises at least one public attribute having public scope such that the at least one public attribute is only accessible to nodes within the first node group.

22. The method of claim 1 wherein the first node group comprises the private node, and wherein the private node comprises at least one protected attribute having protected scope such that the at least one protected attribute is only accessible to the private node and nodes within the first node group which are inherited from the private node.

23. The method of claim 1 wherein the first node group comprises the protected node, and wherein the protected node comprises at least one public attribute having public scope such that the at least one public attribute is only accessible to nodes within the first node group and nodes inherited from the protected node.

24. The method of claim 1 wherein the first node group comprises the protected node, and wherein the protected node comprises at least one protected attribute having protected scope such that the at least one protected attribute is only accessible to the protected node and nodes which are inherited from the protected node.

25. The method of claim 1 wherein the first node group comprises a node comprising at least one private attribute having private scope such that the at least one private attribute is not accessible from outside of the node.

26. The method of claim 1 wherein the first node group comprises a second contract associated with the second node group.

27. The method of claim 26 wherein the first contract is configured to act as a proxy for the second contract in relation to requests from outside the first node group.

28. The method of claim 1 wherein the first contract comprises a contract behavior.

29. The method of claim 1 wherein the first node group is a container comprising an aggregation of nodes.

30. The method of claim 1 wherein the first node group is a graph comprising a hierarchical structure of nodes.

31. A system for access management in an executable graph-based model, the executable graph-based model comprising a plurality of nodes and an overlay structure comprising processing logic, the overlay structure associated with one or more executable nodes of the plurality of nodes, the system comprising processing circuitry and a memory unit operatively coupled to the processing circuitry and having instructions stored thereon that, when executed by the processing circuitry, cause the processing circuitry to:
determine a first node group of the executable graph-based model, the first node group comprising at least one node, wherein the first node group has public scope;
associate a first contract with the first node group such that the first contract is configured to act as a proxy for one or more nodes within the first node group in relation to requests from outside the first node group, wherein the first node group comprises at least one of a group comprising:
(i) a private node having private scope such that the private node is not accessible from outside of the first node group, and
(ii) a protected node having protected scope such that the protected node is only accessible to nodes inherited from the protected node and nodes within a second node group which is inherited from the first node group;
receive a stimulus and a context associated therewith, wherein the stimulus is associated with the first contract;
in response to the stimulus being received, map the stimulus to the first contract to determine an access response; and
process the stimulus based on the access response.

32. A non-transitory computer readable medium for access management in an executable graph-based model, the executable graph-based model comprising a plurality of nodes and an overlay structure comprising processing logic, the overlay structure associated with one or more executable nodes of the plurality of nodes, the non-transitory computer readable medium storing instructions which, when executed by processing circuitry, cause the processing circuitry to:

determine a first node group of the executable graph-based model, the first node group comprising at least one node, wherein the first node group has public scope;

associate a first contract with the first node group such that the first contract is configured to act as a proxy for one or more nodes within the first node group in relation to requests from outside the first node group, wherein the first node group comprises at least one of a group comprising:

(i) a private node having private scope such that the private node is not accessible from outside of the first node group, and (ii) a protected node having protected scope such that the protected node is only accessible to nodes inherited from the protected node and nodes within a second node group which is inherited from the first node group;

receive a stimulus and a context associated therewith, wherein the stimulus is associated with the first contract;

in response to the stimulus being received, map the stimulus to the first contract to determine an access response; and process the stimulus based on the access response.

* * * * *